US012663498B2

(12) United States Patent
Zhou et al.

(10) Patent No.: US 12,663,498 B2
(45) Date of Patent: Jun. 23, 2026

(54) RESOLVING AOA AMBIGUITY BASED ON ROTATION OF USER EQUIPMENT

(71) Applicant: QUALCOMM Incorporated, San Diego, CA (US)

(72) Inventors: Qi Zhou, Milpitas, CA (US); Liang Zhao, Saratoga, CA (US); Feliciano Gomez Martinez, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/598,283

(22) Filed: Mar. 7, 2024

(65) Prior Publication Data

US 2025/0283968 A1 Sep. 11, 2025

(51) Int. Cl.
| | |
|---|---|
| *G01S 3/46* | (2006.01) |
| *G01S 3/04* | (2006.01) |
| *G01S 3/48* | (2006.01) |
| *G01S 5/10* | (2006.01) |

(52) U.S. Cl.
CPC ................ *G01S 3/46* (2013.01); *G01S 3/043* (2013.01); *G01S 5/10* (2013.01)

(58) Field of Classification Search
CPC ... G01S 3/46; G01S 3/48; G01S 3/043; G01S 5/0284; G01S 5/10
USPC ........................................................ 455/456
See application file for complete search history.

(56) References Cited

U.S. PATENT DOCUMENTS

| | | | | |
|---|---|---|---|---|
| 10,401,467 | B2 * | 9/2019 | Moghaddasi | ............. G01S 3/48 |
| 10,481,236 | B2 * | 11/2019 | Simileysky | .............. G01S 3/48 |
| 10,567,905 | B2 * | 2/2020 | Edge | ......................... G01S 5/10 |
| 10,732,253 | B2 * | 8/2020 | Smith | .................. H01Q 21/065 |
| 10,754,002 | B1 * | 8/2020 | Gibbons | ................ G01S 3/801 |
| 11,320,509 | B2 * | 5/2022 | Ertan | ........................ G01S 3/48 |
| 11,774,547 | B2 * | 10/2023 | Knuuttila | ........... G01S 5/02585 |
| | | | | 455/456.1 |
| 11,956,752 | B2 * | 4/2024 | Nguyen | ............. G01S 5/02585 |
| 12,352,879 | B1 * | 7/2025 | Padaki | ...................... G01S 3/46 |
| 12,468,001 | B1 * | 11/2025 | Smith | ....................... G01S 3/28 |
| 2011/0199263 | A1 * | 8/2011 | Kang | ........................ G01S 3/04 |
| | | | | 342/442 |
| 2019/0166453 | A1 * | 5/2019 | Edge | ......................... G01S 5/06 |
| 2020/0150216 | A1 * | 5/2020 | Shpak | ....................... G01S 5/10 |
| 2022/0039059 | A1 * | 2/2022 | Nguyen | ............. G01S 5/02585 |
| 2022/0196782 | A1 * | 6/2022 | Dawar | .................. G01S 5/0294 |
| 2022/0214418 | A1 * | 7/2022 | Nguyen | .................. G01S 3/043 |
| 2023/0052581 | A1 * | 2/2023 | Corbalán Pelegrín | .. G01S 3/023 |
| 2023/0152436 | A1 * | 5/2023 | Sharma | ................... G01S 13/89 |
| | | | | 342/417 |

(Continued)

FOREIGN PATENT DOCUMENTS

| | | | | |
|---|---|---|---|---|
| WO | WO-2022025706 A1 * | 2/2022 | .......... | H04B 17/318 |

*Primary Examiner* — Jinsong Hu

(57) ABSTRACT

A method for determining a true phase difference of arrival (PDOA), includes: determining a plurality of candidate unwrapped PDOAs for a signal transmitted by a target object and received by at least a first antenna and a second antenna of a user equipment (UE), where the plurality of candidate unwrapped PDOAs corresponds to a plurality of orientations of the UE, where a separation distance between the first antenna and the second antenna is greater than or equal to half of a wavelength of the signal; comparing the plurality of unwrapped candidate PDOAs; and identifying a true PDOA based on the comparison.

20 Claims, 16 Drawing Sheets

600 —

Determining a plurality of candidate unwrapped PDOAs for a signal transmitted by a target object and received by at least a first antenna and a second antenna of the UE, where the plurality of candidate unwrapped PDOAs corresponds to a plurality of orientations of the UE, where a separation distance between the first antenna and the second antenna is greater or equal to than half of the wavelength of the signal — 610

Comparing the plurality of candidate unwrapped PDOAs — 620

Identifying a true PDOA based on the comparison — 630

(56) References Cited

U.S. PATENT DOCUMENTS

| | | | |
|---|---|---|---|
| 2023/0178891 A1* | 6/2023 | Newman | H01Q 1/246 |
| | | | 342/372 |
| 2023/0184867 A1* | 6/2023 | Hwang | G01S 3/46 |
| | | | 342/359 |
| 2023/0194644 A1* | 6/2023 | Lavin | G01S 3/043 |
| | | | 342/442 |
| 2023/0266422 A1* | 8/2023 | Schober | G01S 3/48 |
| | | | 455/456.1 |
| 2023/0361483 A1* | 11/2023 | Yun | H01Q 21/28 |
| 2024/0048211 A1* | 2/2024 | Thankamani | H04B 7/0682 |
| 2025/0110197 A1* | 4/2025 | Funane | G01S 5/02 |
| 2025/0370086 A1* | 12/2025 | Gomez Martinez | G01S 3/023 |

* cited by examiner

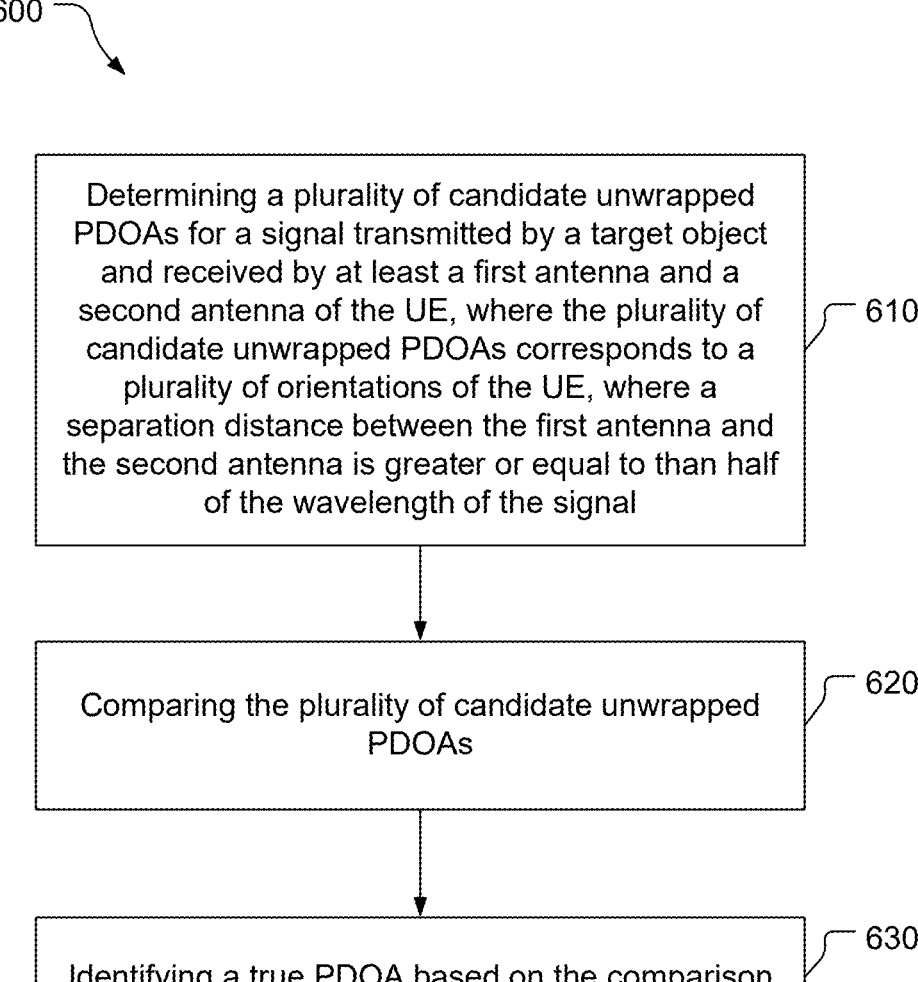

600

Determining a plurality of candidate unwrapped PDOAs for a signal transmitted by a target object and received by at least a first antenna and a second antenna of the UE, where the plurality of candidate unwrapped PDOAs corresponds to a plurality of orientations of the UE, where a separation distance between the first antenna and the second antenna is greater or equal to than half of the wavelength of the signal — 610

Comparing the plurality of candidate unwrapped PDOAs — 620

Identifying a true PDOA based on the comparison — 630

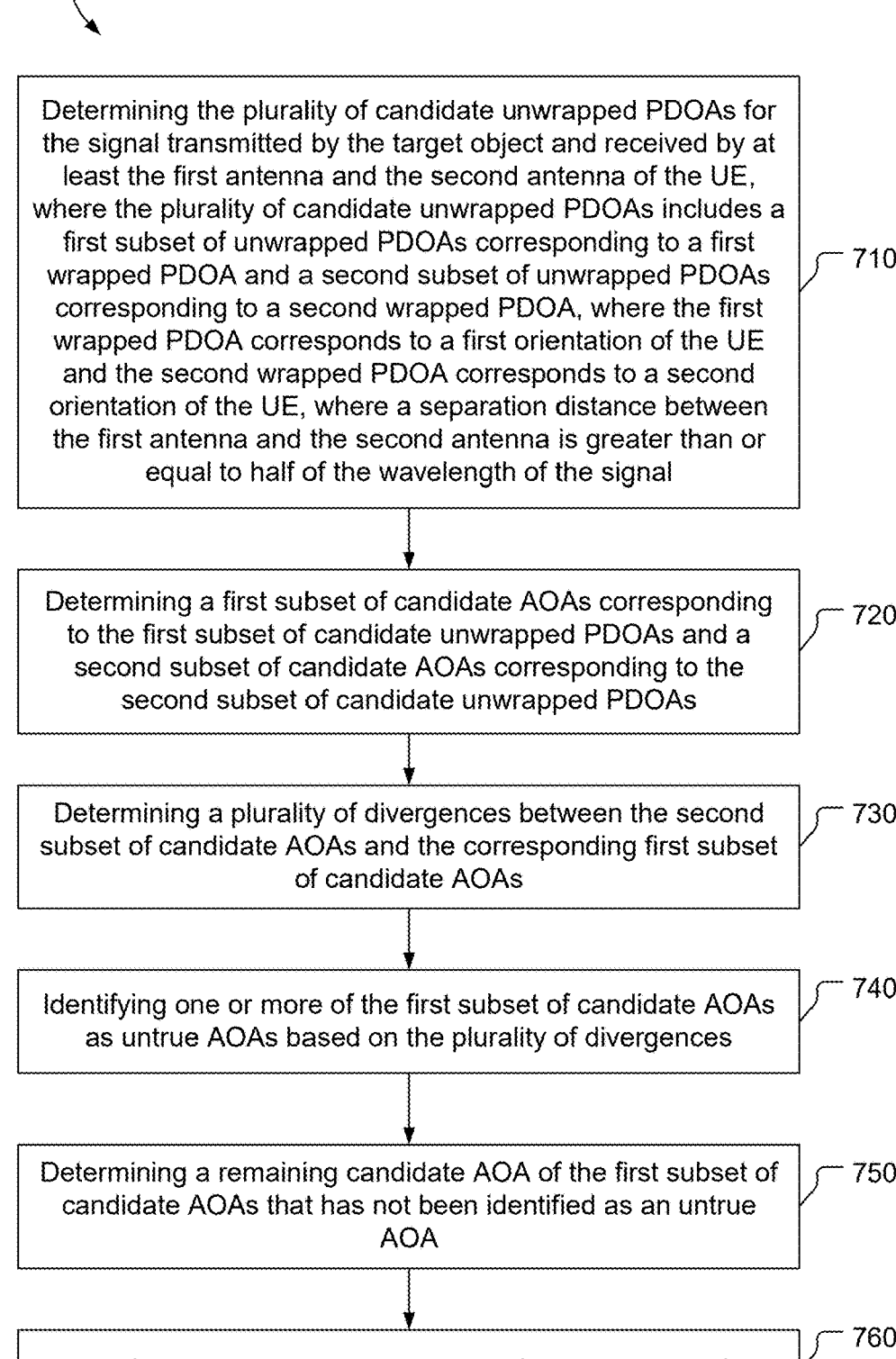

Determining the plurality of candidate unwrapped PDOAs for the signal transmitted by the target object and received by at least the first antenna and the second antenna of the UE, where the plurality of candidate unwrapped PDOAs includes a first subset of unwrapped PDOAs corresponding to a first wrapped PDOA and a second subset of unwrapped PDOAs corresponding to a second wrapped PDOA, where the first wrapped PDOA corresponds to a first orientation of the UE and the second wrapped PDOA corresponds to a second orientation of the UE, where a separation distance between the first antenna and the second antenna is greater than or equal to half of the wavelength of the signal

710

Determining a first subset of candidate AOAs corresponding to the first subset of candidate unwrapped PDOAs and a second subset of candidate AOAs corresponding to the second subset of candidate unwrapped PDOAs

720

Determining a plurality of divergences between the second subset of candidate AOAs and the corresponding first subset of candidate AOAs

730

Identifying one or more of the first subset of candidate AOAs as untrue AOAs based on the plurality of divergences

740

Determining a remaining candidate AOA of the first subset of candidate AOAs that has not been identified as an untrue AOA

750

Identifying the remaining candidate AOA as the true AOA

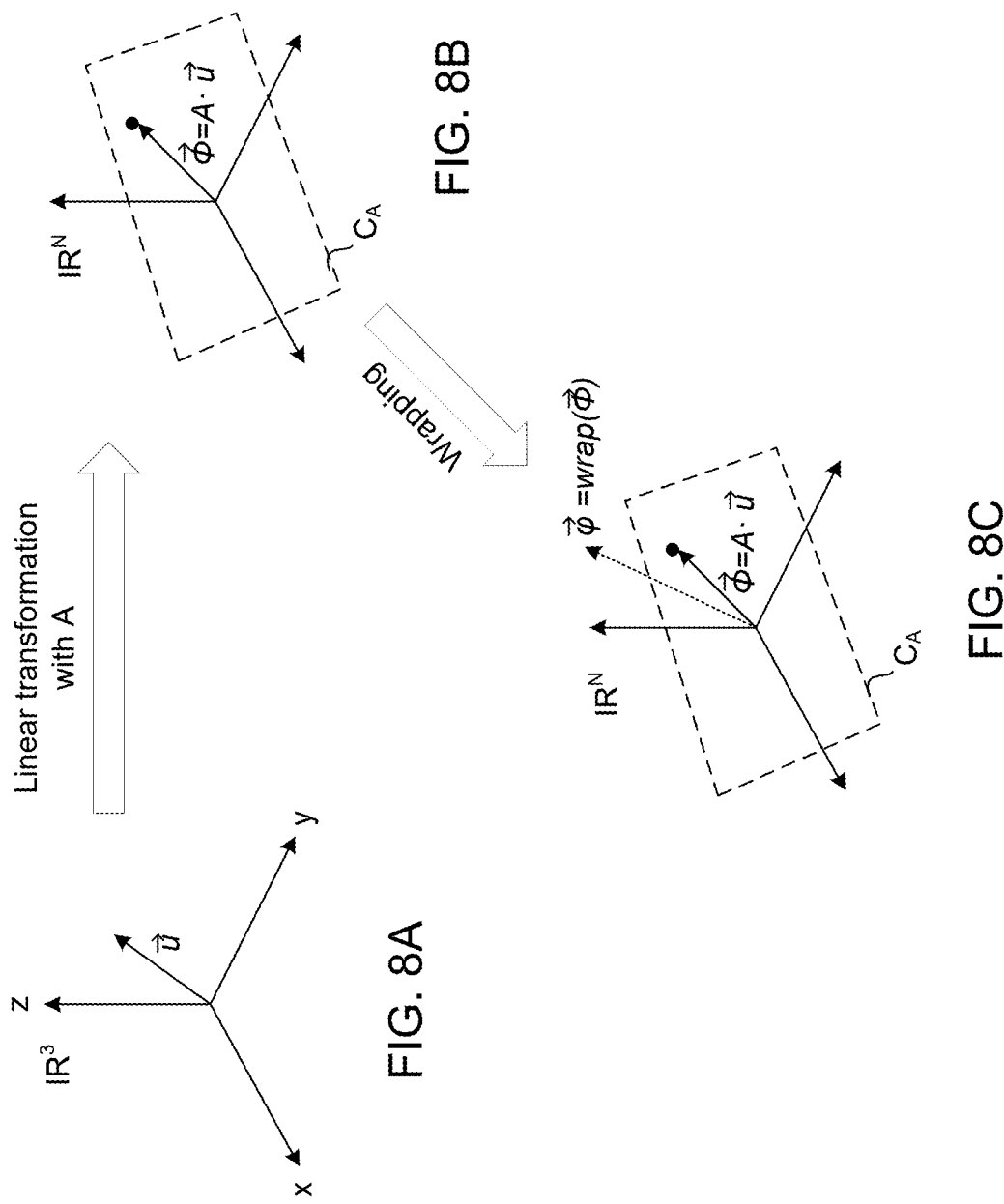

900

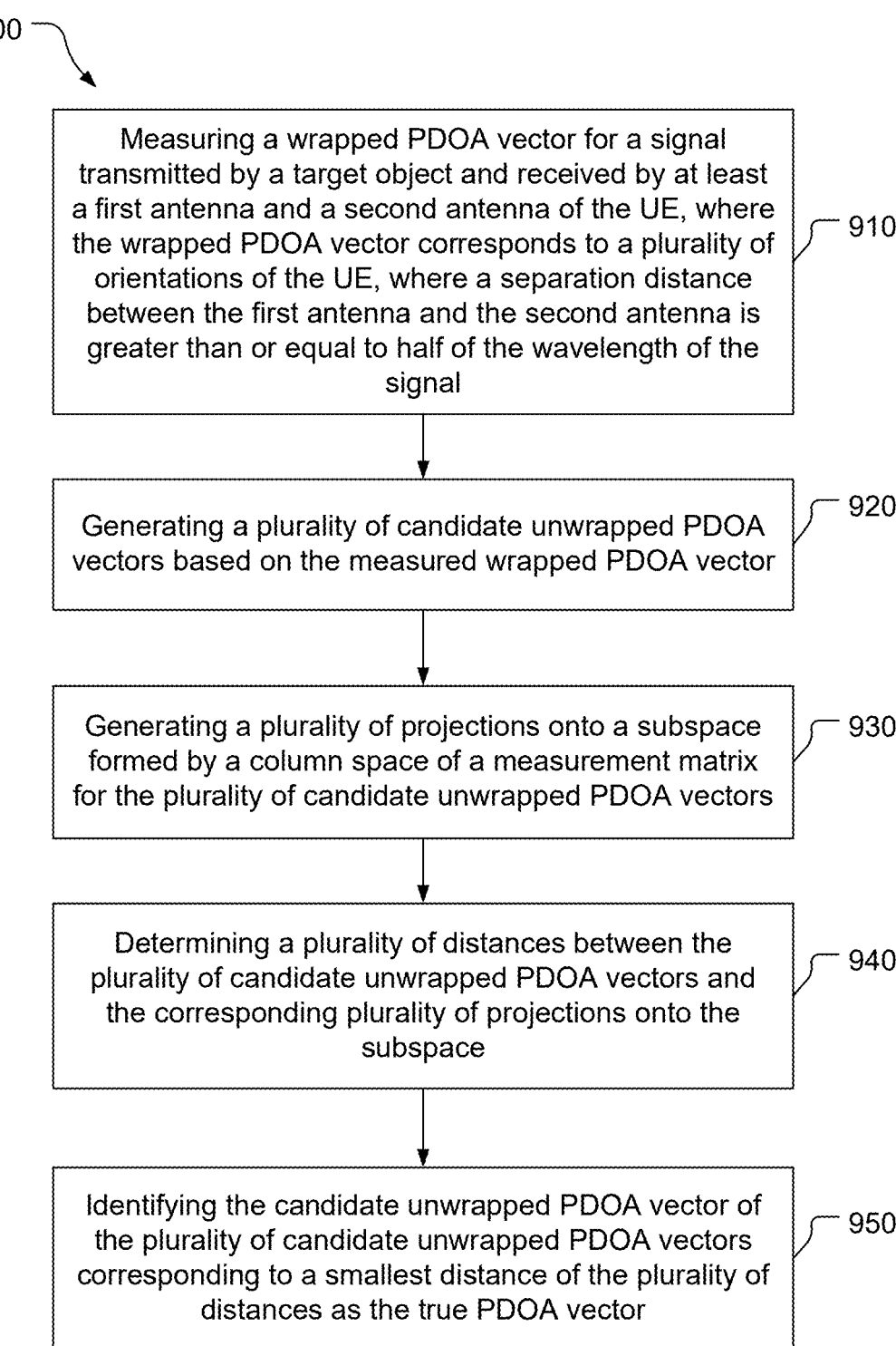

Measuring a wrapped PDOA vector for a signal transmitted by a target object and received by at least a first antenna and a second antenna of the UE, where the wrapped PDOA vector corresponds to a plurality of orientations of the UE, where a separation distance between the first antenna and the second antenna is greater than or equal to half of the wavelength of the signal

910

Generating a plurality of candidate unwrapped PDOA vectors based on the measured wrapped PDOA vector

920

Generating a plurality of projections onto a subspace formed by a column space of a measurement matrix for the plurality of candidate unwrapped PDOA vectors

930

Determining a plurality of distances between the plurality of candidate unwrapped PDOA vectors and the corresponding plurality of projections onto the subspace

940

Identifying the candidate unwrapped PDOA vector of the plurality of candidate unwrapped PDOA vectors corresponding to a smallest distance of the plurality of distances as the true PDOA vector

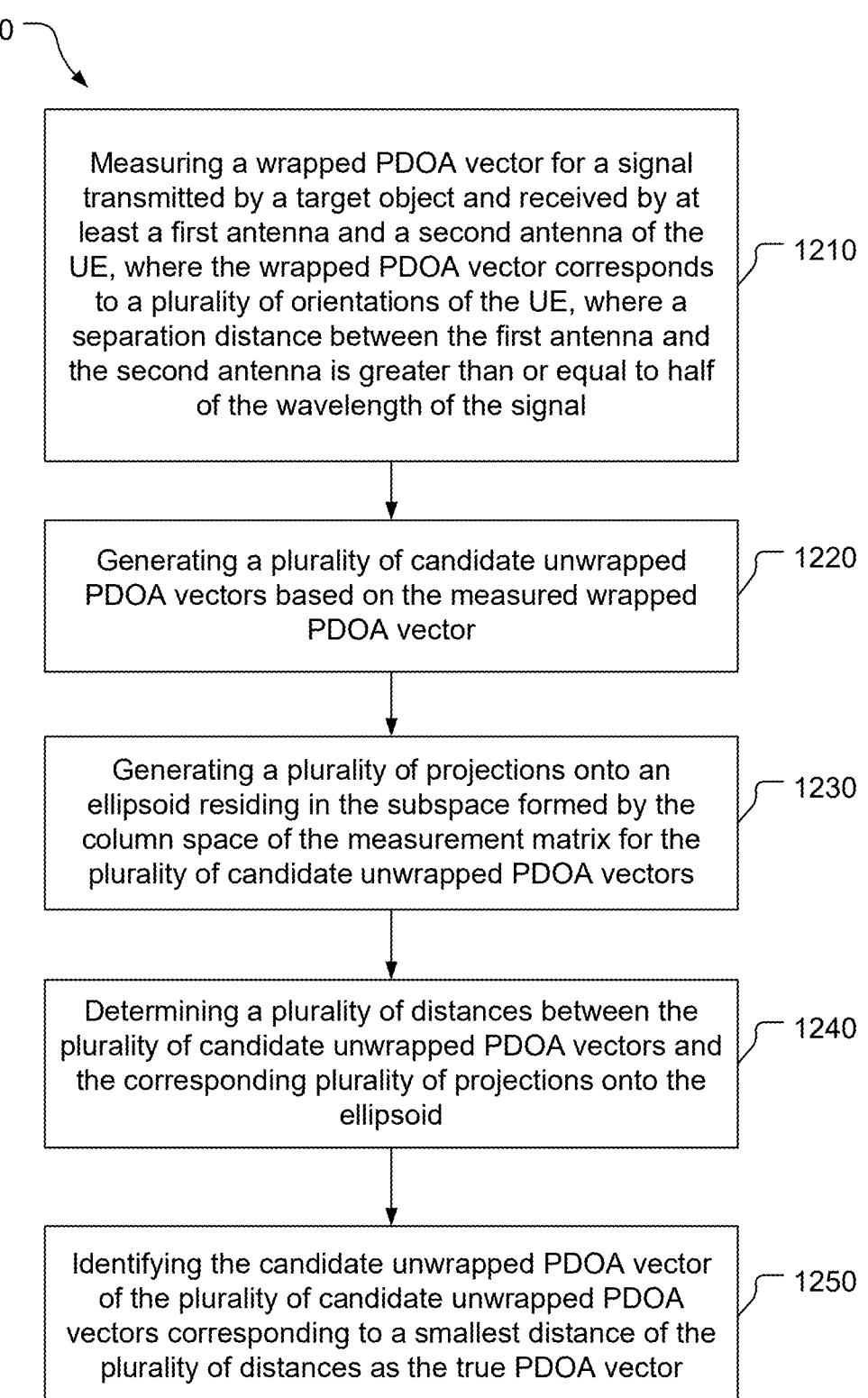

Measuring a wrapped PDOA vector for a signal transmitted by a target object and received by at least a first antenna and a second antenna of the UE, where the wrapped PDOA vector corresponds to a plurality of orientations of the UE, where a separation distance between the first antenna and the second antenna is greater than or equal to half of the wavelength of the signal — 1210

Generating a plurality of candidate unwrapped PDOA vectors based on the measured wrapped PDOA vector — 1220

Generating a plurality of projections onto an ellipsoid residing in the subspace formed by the column space of the measurement matrix for the plurality of candidate unwrapped PDOA vectors — 1230

Determining a plurality of distances between the plurality of candidate unwrapped PDOA vectors and the corresponding plurality of projections onto the ellipsoid — 1240

Identifying the candidate unwrapped PDOA vector of the plurality of candidate unwrapped PDOA vectors corresponding to a smallest distance of the plurality of distances as the true PDOA vector — 1250

FIG. 12

RESOLVING AOA AMBIGUITY BASED ON ROTATION OF USER EQUIPMENT

BACKGROUND

Finding a lost object using wireless signals between a user equipment and the lost object often relies on the availability of antennas for the determination of 3D Angle of Arrival (AoA) information. Typically, the separation between each pair of antennas is required to be less than half of the wavelength of the signal received by the antennas in order to avoid angle ambiguity.

SUMMARY

In an example, a method for determining a true phase difference of arrival (PDOA), includes: determining a plurality of candidate unwrapped PDOAs for a signal transmitted by a target object and received by at least a first antenna and a second antenna of a user equipment (UE), where the plurality of candidate unwrapped PDOAs corresponds to a plurality of orientation of the UE, where a separation distance between the first antenna and the second antenna is greater than or equal to half of a wavelength of the signal; comparing the plurality of unwrapped candidate PDOAs; and identifying a true PDOA based on the comparison.

In another example, a user equipment (UE), includes: a first antenna; a second antenna; one or more memories; and one or more processors communicatively coupled to the one or more memories, the one or more processors being configured to: determine a plurality of candidate unwrapped phase difference of arrivals (PDOAs) for a signal transmitted by a target object and received by at least the first antenna and the second antenna, where the plurality of candidate unwrapped PDOAs corresponds to a plurality of orientations of the UE, where a separation distance between the first antenna and the second antenna is greater than or equal to half of a wavelength of the signal; compare the plurality of unwrapped candidate PDOAs; and identify a true PDOA based on the comparison.

In another example, a non-transitory, processor-readable storage medium including processor-readable instructions to cause one or more processors to: determine a plurality of candidate unwrapped phase difference of arrivals (PDOAs) for a signal transmitted by a target object and received by at least a first antenna and a second antenna of a user equipment (UE), where the plurality of candidate unwrapped PDOAs corresponds to a plurality of orientations of the UE, where a separation distance between the first antenna and the second antenna is greater than or equal to half of a wavelength of the signal; compare the plurality of unwrapped candidate PDOAs; and identify a true PDOA based on the comparison.

BRIEF DESCRIPTION OF THE DRAWINGS

FIG. 6 illustrates a flow diagram of a method for determining a true phase difference of arrival (PDOA), where a separation L between two antennas of the user equipment is greater than or equal to $\lambda/2$.

FIG. 7 is a flow diagram illustrating a first example implementation of identifying the true PDOA.

FIGS. 8A-8C are diagrams showing the measurement of a wrapped PDOA.

FIG. 9 is a flow diagram illustrating a second example implementation of identifying the true PDOA.

FIGS. 11A-11C are diagrams illustrating the projection of unwrapped PDOA vectors onto a subspace.

FIG. 12 is a flow diagram illustrating a third example implementation of identifying the true PDOA.

DETAILED DESCRIPTION

Techniques are discussed herein for determining a true phase difference of arrival (PDOA) using phase delay information determined from two antennas with a separation distance L greater than or equal to $\lambda/2$, where $\lambda$ is the wavelength of the wireless ranging signal. The PDOA of a wireless signal received by an antenna of a user equipment (UE) is dependent on a spatial angle $\theta$. When $L \geq \lambda/2$, the spatial angles $\theta$ have aliasing, where the PDOA corresponds to multiple spatial angles $\theta$, i.e., the measured PDOA includes both "wrapped" and "unwrapped" angles, which injects angle ambiguity. Only one of the unwrapped angles corresponds to the true PDOA. Examples for resolving angle ambiguities and determining the true PDOA, where $L \geq \lambda/2$, may be based on comparisons of PDOA measurements obtained for different orientations of the UE. In one example, the comparison may leverage the fact that the true PDOA will be consistent over rotations of the UE, while untrue PDOAs will diverge over the rotations. In another example, the comparison may leverage the fact that a physically valid PDOA vector must lie in a subspace of a measurement matrix for a plurality of candidate unwrapped PDOAs and untrue PDOAs will likely be outside of the subspace. Once the angle ambiguities are resolved, and the true PDOA is determined, the true PDOA may be used to determine the Angle of Arrival (AoA) and the location of a target object using wireless ranging signals and positions of the UE. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

Figure 1:
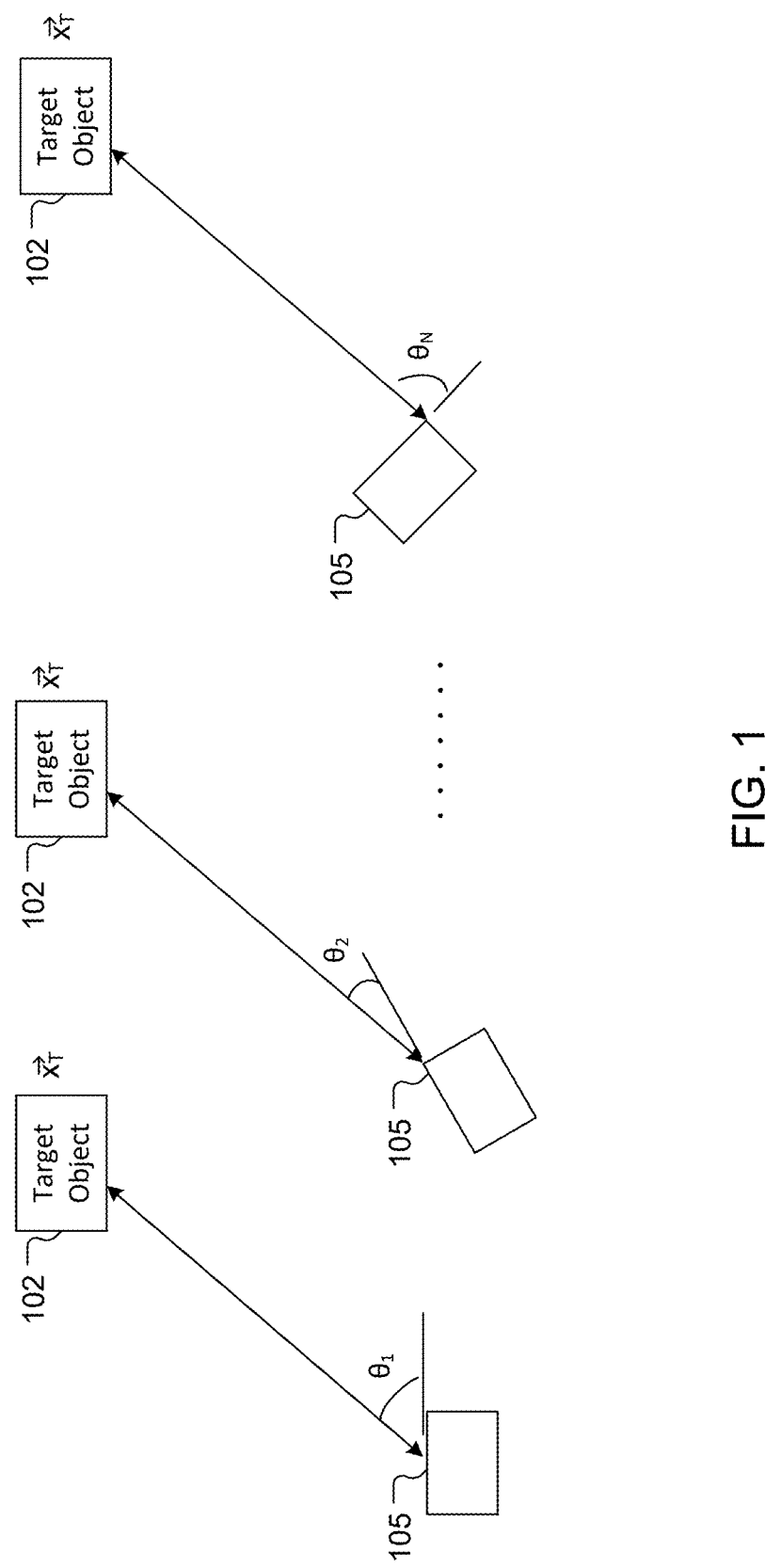
FIG. 1 is a simplified diagram of an example system including a user equipment and a target object to be found.

FIG. 1 is a simplified diagram of an example system including a user equipment and a target object to be found. In general, the user equipment (UE) 105 may be any wireless communication device (e.g., a mobile phone, router, tablet computer, laptop computer, consumer asset tracking device, Internet of Things (IoT) device, etc.). A UE 105 may be mobile or may (e.g., at certain times) be stationary. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. The UE 105 may be embodied by any of a number of types of devices including but not limited to printed circuit (PC) cards, compact flash devices, external or internal modems, wireless or wireline phones, smartphones, tablets, consumer asset tracking devices, asset tags, and so on. The UE 105 may comprise and/or may be referred to as a device, a mobile device, a wireless device, or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, virtual reality headsets, augmented reality glasses, or some other portable or moveable device. The UE 105 supports wireless communication with the target object 102 using one or more Radio Access Technologies (RATs) such as IEEE 802.11 WiFi® (also referred to as Wi-Fi®), Bluetooth® (BT), Ultra-wideband (UWB), etc., that may be used by wireless ranging techniques.

The target object 102 may be another UE. The target object may be any of a variety of devices, e.g., a set of earbuds (or one earbud), earbud chargers, a set of headphones, a smart tag, or any other device capable of wireless communication with the UE 105 using one or more of the RATs that may be used for wireless ranging.

Referring to FIG. 1, to locate the target object 102 according to an example embodiment, the UE 105 changes orientations. The UE 105 communicates with the target object 102 using signals of one or more RATs. A phase difference of arrival (PDOA) between two antennas are measured for different orientations of the UE 105. The time of arrival of a signal at the first antenna 246 may be measured and compared to the time of arrival of the signal at the second antenna 250. The relative phase delay between the signal at the first antenna 246 and the second antenna 250 can be measured to calculate the PDOA. The UE 105 may calculate the angle of arrival (AoA) based on PDOA and may calculate a position of the target object 102 and a direction of the target object 102 relative to the position of the UE 105 based on the AoA.

Figure 2A:
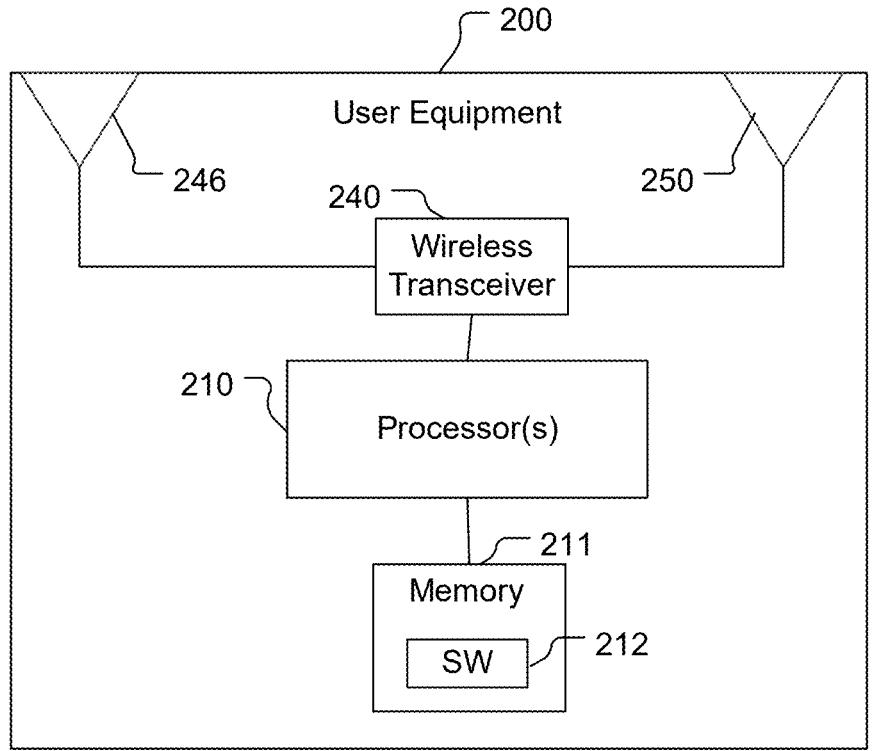
FIG. 2A illustrates a block diagram of an example of a user equipment.

FIG. 2A illustrates an example user equipment 200. The UE 200 may be an example of UE 105. The UE 200 may comprise one or more processors 210, one or more memories 211 including software (SW) 212, and one or more wireless transceivers 240, although any of these devices may be referred to in the singular (e.g., the processor 210) while including one or more of the respective devices. The UE 200 may further comprise a first antenna 246 and a second antenna 250. The one or more processors 210 and the one or more memories 211 may be communicatively coupled to each other by a bus 220 (which may be configured, e.g., for optical and/or electrical communication). The transceiver 240 is configured for wireless communication using one or more RATs.

Figure 2B:
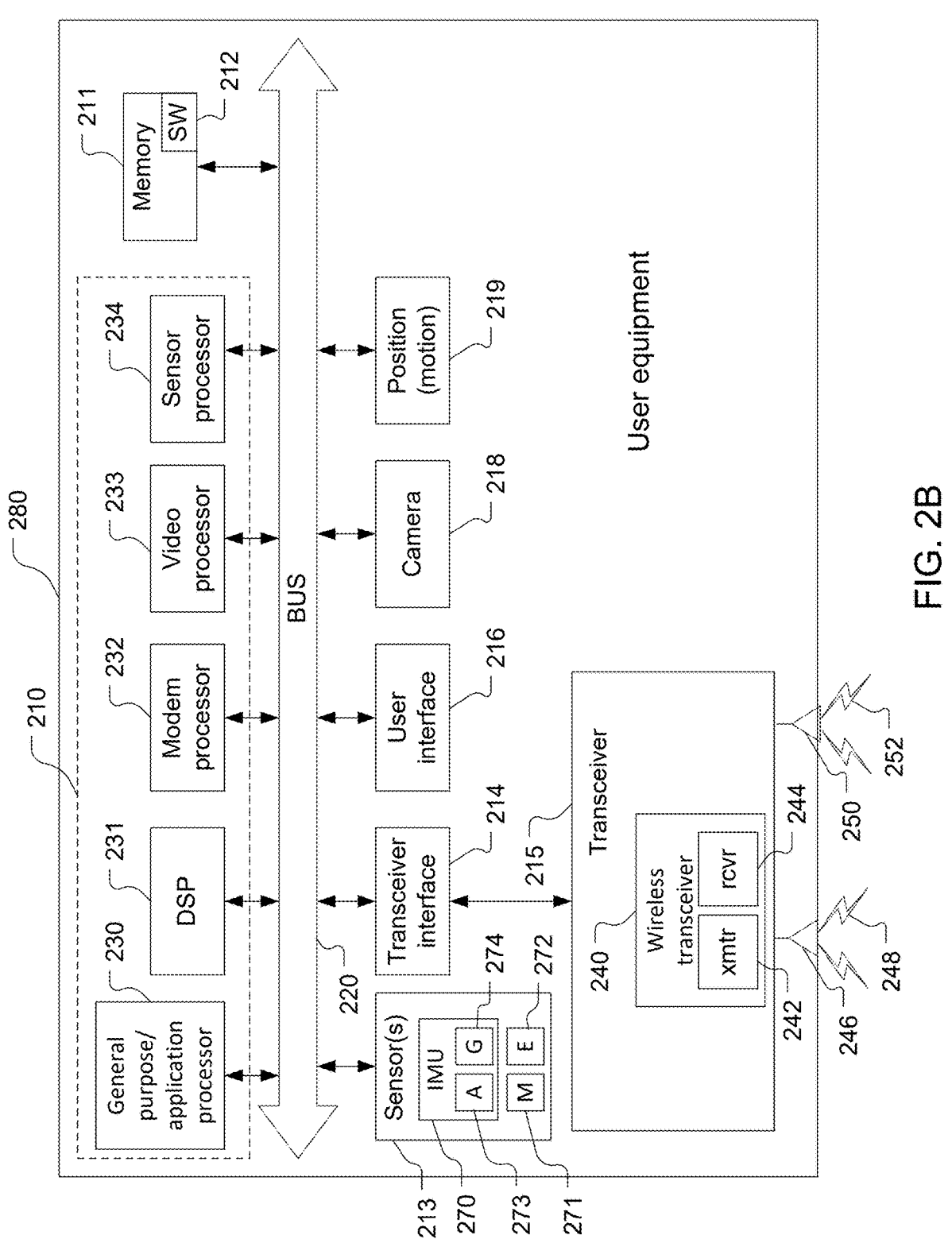
FIG. 2B illustrates a block diagram of components of the example user equipment shown in FIG. 2A.

FIG. 2B illustrates an example user equipment 280. The UE 280 may be an example of the UE 200 shown in FIG. 2B. The UE 280 may comprise a computing platform including one or more processors 210, one or more memories 211 including software (SW) 212, one or more sensors 213, a transceiver interface 214 for the transceiver 215 that includes the wireless transceiver 240, a user interface 216, a camera 218, and a position device (PD) 219. The one or more processors 210, the one or more memories 211, the one or more sensors 213, the transceiver interface 214, the user interface 216, the camera 218, and the position device 219 may be communicatively coupled to each other by a bus 220 (which may be configured, e.g., for optical and/or electrical communication). The one or more processors 210 may include one or more intelligent hardware devices, e.g., a central processing unit (CPU), one or more microcontrollers, an application specific integrated circuit (ASIC), etc. The one or more processors 210 may comprise multiple processors including one or more general-purpose/application processors 230, one or more Digital Signal Processors (DSP) 231, one or more modem processors 232, one or more video processors 233, and/or one or more sensor processors 234. For example, the sensor processor 234 may comprise, e.g., processors for RF (radio frequency) sensing (with one or more wireless signals transmitted and reflection(s) used to identify, map, and/or track an object), and/or ultrasound, etc. The one or more modem processors 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 280 for connectivity. The one or more memories 211 may be one or more non-transitory storage media that may include random access memory (RAM), flash memory, disc memory, and/or read-only memory (ROM), etc. The one or more memories 211 may store the software 212 which may be processor-readable, processor-executable software code containing instructions that may be configured to, when executed, cause the one or more processors 210 to perform various functions described herein. Alternatively, the software 212 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the one or more processors 210 performing a function as shorthand for one or more of the processors 230-234 performing the function. The description herein may refer to the UE 280 performing a function as shorthand for one or more appropriate components of the UE 280 performing the function. Functionality of the one or more processors 210 is discussed more fully below.

The configuration of the UE 280 shown in FIG. 2B is an example and not limiting of the disclosure, including the claims, and other configurations may be used. For example, an example configuration of the UE 280 includes one or more of the processors 230-234 of the processor 210, the memory 211, a wireless transceiver, and one or more of the sensor(s) 213, the user interface 216, the camera 218, and/or the PD 219.

The UE 280 may comprise the modem processor 232 that may be capable of performing baseband processing of signals received and down-converted by the transceiver 215. The modem processor 232 may perform baseband processing of signals to be upconverted for transmission by the transceiver 215. Also, or alternatively, baseband processing may be performed by the general-purpose/application processor 230 and/or the DSP 231. Other configurations, however, may be used to perform baseband processing.

The UE 280 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 280 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 280 is fixed (stationary) or mobile. For example, for relative positioning information, the sensors/IMU may be used to determine the angle and/or orientation of the other device with respect to the UE 280, etc.

The IMU 270 may be configured to provide measurements about a direction of motion and/or a speed of motion of the UE 280, which may be used in relative location determination. For example, the one or more accelerometers 273 and/or the one or more gyroscopes 274 of the IMU 270 may detect, respectively, a linear acceleration and a speed of rotation of the UE 280. The linear acceleration and speed of rotation measurements of the UE 280 may be integrated over time to determine an instantaneous direction of motion as well as a displacement of the UE 280. The instantaneous direction of motion and the displacement may be integrated to track a location of the UE 280. For example, a reference position of the UE 280 may be determined for a moment in time and measurements from the accelerometer(s) 273 and the gyroscope(s) 274 taken after this moment in time may be used (e.g., in dead reckoning) to determine present position of the UE 280 based on movement (direction and distance) of the UE 280 relative to the reference location.

The magnetometer(s) 271 may determine magnetic field strengths in different directions which may be used to determine orientation of the UE 280. For example, the orientation may be used to provide a digital compass for the UE 280. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the one or more processors 210.

The transceiver 215 may include a wireless transceiver 240 configured to communicate with other devices through wireless connections. For example, the wireless transceiver 240 may include a wireless transmitter 242 and a wireless receiver 244 coupled to a first antenna 246 and a second antenna 250 for transmitting and/or receiving wireless signals 248 and 252, respectively, and transducing signals from the wireless signals 248 and 252 to wired (e.g., electrical and/or optical) signals and from wired (e.g., electrical and/or optical) signals to the wireless signals 248 and 252. The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals according to a variety of radio access technologies (RATs) such as cellular (e.g., 3GPP defined communications including 4G, LTE, 5G NR, 6G, and the like), IEEE 802.11 (including IEEE 802.11az), WiFi®, WiFi® Direct (WiFi®-D), Bluetooth®, Ultra-Wide Band (UWB) (including 802.15.4), etc. A "radio," as used herein, refers to a wireless transmitter and/or wireless receiver configured to communicate signals according to a specific RAT. The transceiver 215 may be communicatively coupled to the transceiver interface 214, e.g., by optical and/or electrical connection. The transceiver interface 214 may be at least partially integrated with the transceiver 215. The wireless transmitter 242 and the wireless receiver 244 may include multiple transmitters and/or multiple receivers, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 280. For example, the user interface 216 may store indications of analog and/or digital signals in the one or more memories 211 to be processed by DSP 231 and/or the general-purpose/application processor 230 in response to action from a user or a request from an application. Similarly, applications hosted on the UE 280 may store indications of analog and/or digital signals in the one or more memories 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 216 may comprise one or more touch sensors responsive to touching and/or pressure, e.g., on a keyboard and/or touch screen of the user interface 216.

The UE 280 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also, or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 280, motion of the UE 280, and/or relative position of the UE 280, and/or time. The PD 219 may work in conjunction with the one or more processors 210 and the one or more memories 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 280 using terrestrial-based signals (e.g., at least some of the wireless signals 248) for trilateration. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 280. The PD 219 may be configured to determine a relative motion or orientation by the UE 280 by comparing multiple images captured by the camera 218 and tracking how a common "point of interest" within the images moves between images. The PD 219 may be configured to use one or more other techniques (e.g., relying on the UE's self-reported location (e.g., part of the UE's position beacon)) for determining the location of the UE 280, and may use a combination of techniques (e.g., satellite and terrestrial positioning signals) to determine the location of the UE 280. The PD 219 may include one or more of the sensors 213 (e.g., gyroscope(s), accelerometer(s), magnetometer(s), etc.) that may sense orientation and/or motion of the UE 280 and provide indications thereof that the one or more processors 210 (e.g., the general-purpose/application processor 230 and/or the DSP 231) may be configured to use to determine motion (e.g., a velocity vector and/or an acceleration vector) of the UE 280. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, and/or another component of the UE 280, and may be provided by hardware, software, firmware, or various combinations thereof.

Figure 3:
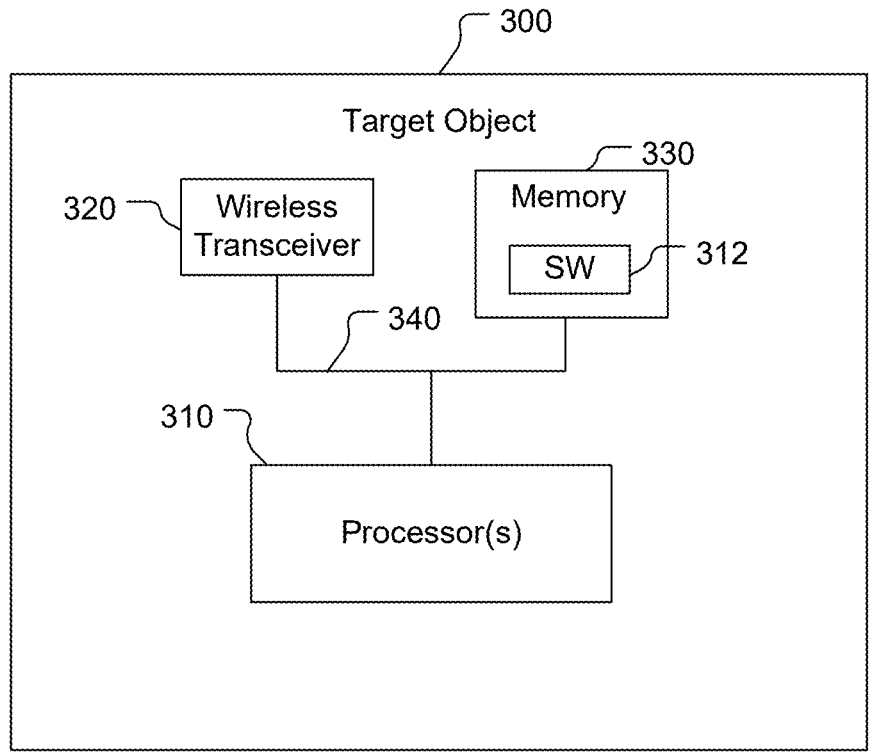
FIG. 3 illustrates a block diagram of an example of a target object.

FIG. 3 illustrates an example target object 300. The target object 300 may be an example of the target object 102. The target object 300 may comprise one or more processors 310, one or more memories 330 (possibly including SW 312), and one or more wireless transceivers 320, although any of these devices may be referred to in the singular (e.g., the processor 310) while including one or more of the respective devices. The one or more processors 310 and the one or more memories 330 may be communicatively coupled to each other by a bus 340 (which may be configured, e.g., for optical and/or electrical communication). The transceiver 320 may be configured for wireless communication using one or more RATs. For example, the transceiver 320 may be configured to wirelessly communicate with the transceiver 240 of the UE 200 using one or more RATs.

Figures 4A, 4B:
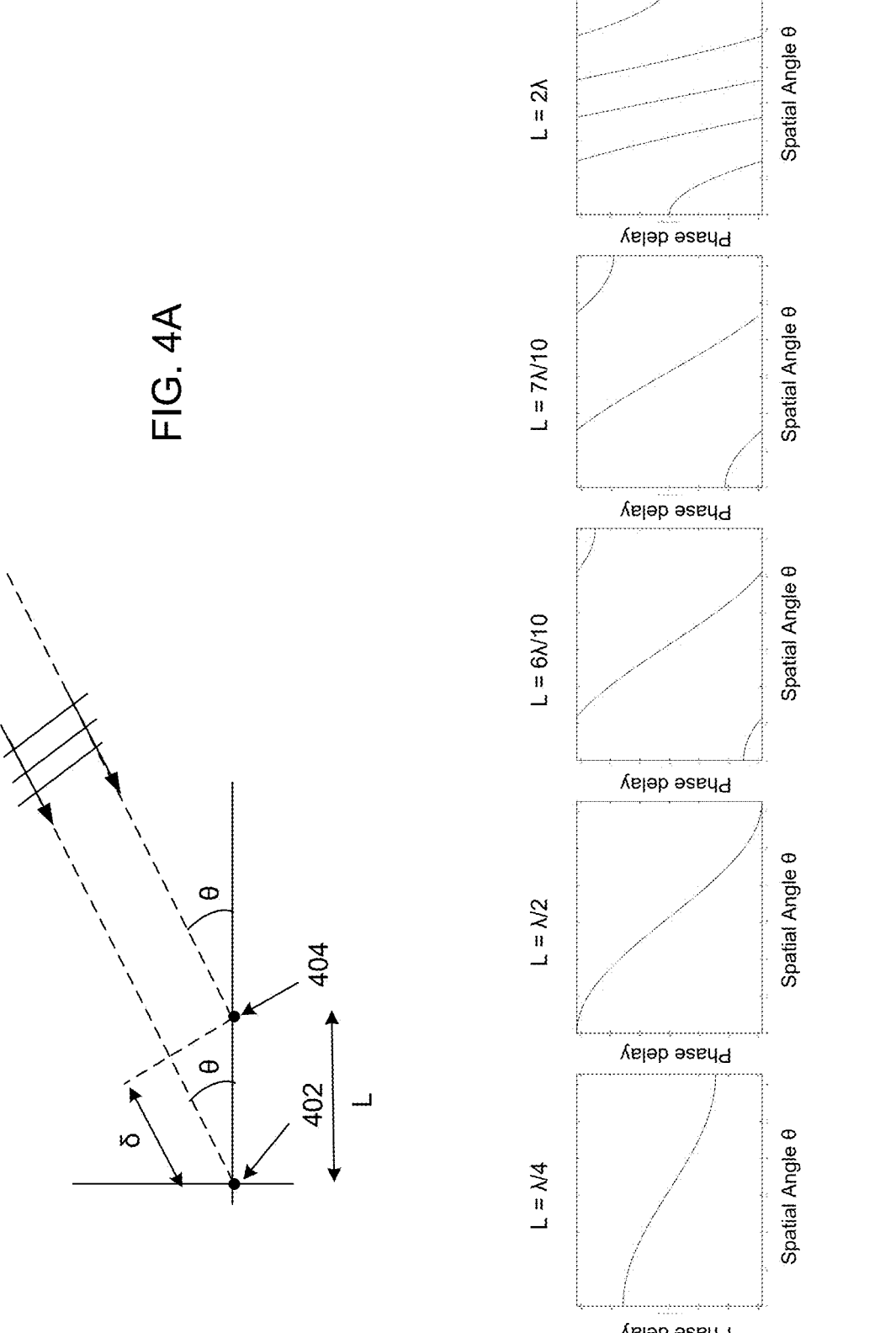
FIG. 4A illustrates a coordinate system for the reception of a signal by a first and a second antenna of the user equipment.
FIG. 4B illustrates the relationship between a spatial angle and a phase delay for different antenna separation distances L smaller than, equal, and greater than $\lambda/2$.

In one embodiment, the UE 105 (e.g., of FIG. 1) includes at least two antennas, the first antenna 246 and the second antenna 250. FIG. 4A illustrates a coordinate system for the reception of a signal by the first and second antennas 246, 250. Both the first and second antennas 246, 250 receive the same wireless signal at a spatial angle $\theta$. The first antenna 246 receives a wireless signal at reception point 402, and the second antenna 250 receives the same wireless signal at reception point 404. L is the separation distance between the first antenna 246 and the second antenna 250. The wireless signal received by the first antenna 246 travels an extra distance $\delta$ than the wireless signal received by the second antenna 250, with $\delta=L \cdot \cos \theta$. The PDOA of the wireless signals received by the first antenna 246 and the second antenna 250 is dependent on the spatial angle $\theta$. FIG. 4B illustrates the relationship between the spatial angle $\theta$ and the PDOA for different antenna separation distances L. When L=$\lambda$/4, the PDOA corresponds to one spatial angle $\theta$. However, when L becomes larger than $\lambda$/2, such as L=6$\lambda$/10, L=7$\lambda$/10, or L=2$\lambda$, the spatial angles $\theta$ have aliasing, where the PDOA corresponds to multiple spatial angles $\theta$, injecting angle ambiguity. When L<$\lambda$/2, the PDOA stays in the range $(-\pi, \pi)$, and the PDOA angle may be measured without ambiguity. When L≥$\lambda$/2, the PDOA may include angles outside of the $(-\pi, \pi)$ range, i.e., the PDOA may "wrap" around the range, resulting in the measured PDOA which is wrapped corresponding to multiple spatial angles $\theta$. Only one of the multiple spatial angles $\theta$ corresponds to the true AoA.

Figure 5B:
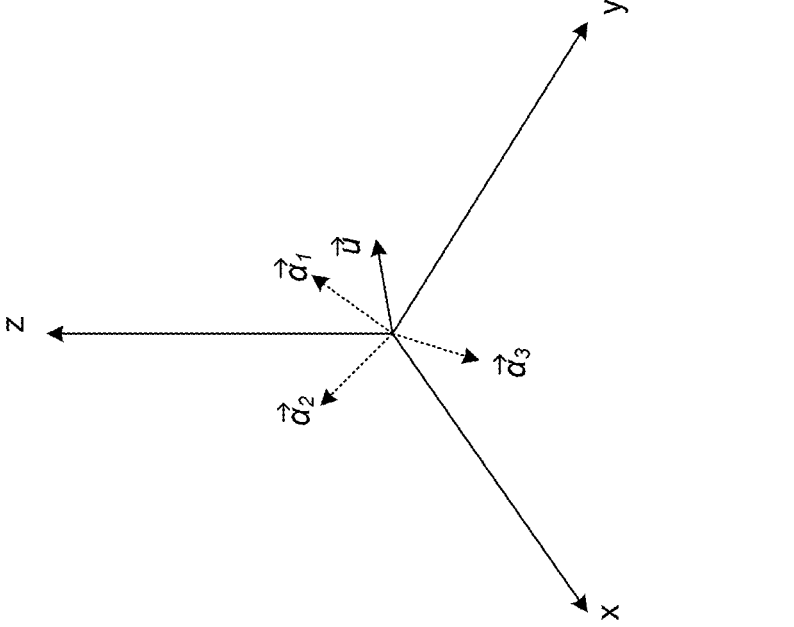
FIG. 5B is a diagram showing multiple unit antenna vectors obtained by rotating the user equipment.
Figure 5A:
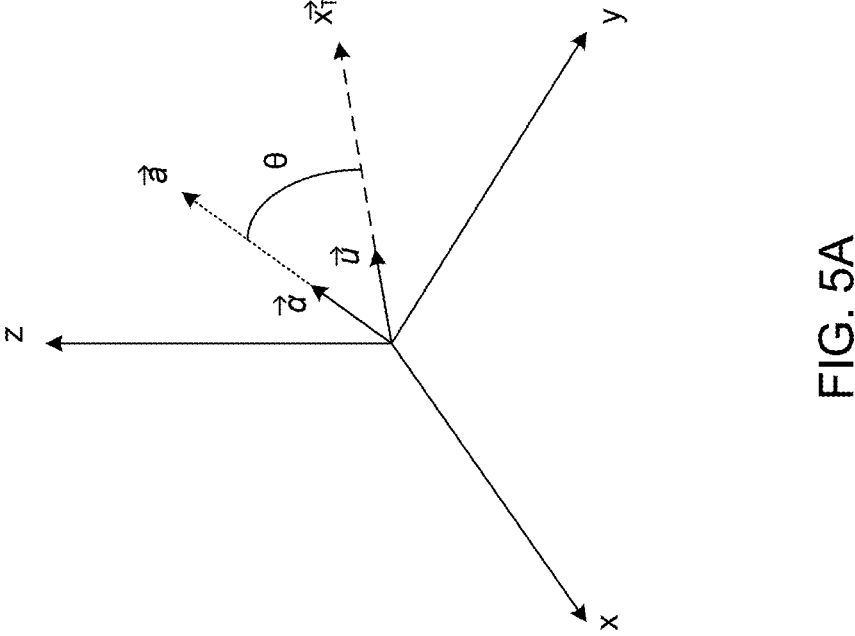
FIG. 5A is a diagram showing relationships between a target position, a target direction vector, an antenna vector, a unit antenna vector, and a spatial angle of arrival.

FIG. 5A is a diagram illustrating a geometric arrangement in the measurement of a PDOA for a UE with two antennas. A first antenna (e.g., antenna 246) may be assumed to be located at the origin of the coordinates, while the second antenna (e.g., antenna 250) may be located at a position $\vec{a}=(a_x, a_y, a_z)^T$, where $\vec{a}$ is the antenna vector with length $L=\|\vec{a}\|$. Assume that the target object 102 is at position $\vec{x_T}$, and the target object 102 is sending an RF signal (e.g., UWB, WiFi, BT, etc.) that can be detected by the UE 105. Once the RF signal arrives at the antennas 246, 250 of the UE 105, the PDOA $\Phi$ may be given by:

$$\Phi = \frac{2\pi L}{\lambda} \cos(\theta) = \frac{2\pi L}{\lambda} \frac{\vec{a} \cdot \vec{x_T}}{\|\vec{a}\| \|\vec{x_T}\|} = \frac{2\pi L}{\lambda} \vec{a} \cdot \vec{u} \qquad \text{(Eq. 1)}$$

where $\theta$ is the spatial angle between the vector for the target position $\vec{x_T}$ and the antenna vector $\vec{a}$, $\vec{\alpha}$ is a unit vector in the direction of $\vec{a}$, and $\vec{u}$ is a unit vector in the direction of $\vec{x_T}$. The diagram of FIG. 5A illustrates the relationship between $\vec{x_T}$, $\vec{u}$, $\vec{a}$, $\vec{a}$, and $\theta$. When the antenna spacing L is less than $\lambda$/2, the PDOA P stays in the range $(-\pi, \pi)$, which may be measured without angle ambiguity. Given the measured PDOA $\Phi$, the original spatial angle $\theta$ may be determined using Eq. 2:

$$\theta = \arccos\left(\frac{\lambda\Phi}{2\pi L}\right) \qquad \text{(Eq. 2)}$$

When the UE 105 is rotated to different orientations, multiple PDOAs $\Phi_i$ may be measured, with a PDOA $\Phi_i$ and an antenna vector $\alpha_i$ corresponding to each orientation of the UE 105. Here, the UE 105 is rotated with no displacement, or with a displacement much smaller than the distance to the target object 102 and may be disregarded. FIG. 5B illustrates three antenna vectors $(\vec{\alpha_1}, \vec{\alpha_2}, \vec{\alpha_3})$ obtained by rotating the UE 105 to three different orientations. The PDOA vector $\vec{\Phi}$ may be expressed in matrix form:

$$\vec{\Phi} = \begin{bmatrix} \Phi_1 \\ \Phi_2 \\ \vdots \\ \Phi_N \end{bmatrix} = \frac{2\pi L}{\lambda} \begin{bmatrix} \vec{\alpha_1} \cdot \vec{u} \\ \vec{\alpha_2} \cdot \vec{u} \\ \vdots \\ \vec{\alpha_N} \cdot \vec{u} \end{bmatrix} = \frac{2\pi L}{\lambda} \underbrace{\begin{bmatrix} \alpha_{1x} & \alpha_{1y} & \alpha_{1z} \\ \alpha_{2x} & \alpha_{2y} & \alpha_{2z} \\ \cdots & \cdots & \cdots \\ \alpha_{Nx} & \alpha_{Ny} & \alpha_{Nz} \end{bmatrix}}_{A} \cdot \overbrace{\begin{bmatrix} u_x \\ u_y \\ u_z \end{bmatrix}}^{\vec{u}} = A \cdot \vec{u} \qquad \text{(Eq. 3)}$$

where A is the measurement matrix and N is the number of different orientations. To determine the position of the target object 102, the goal is to determine the value of $\vec{u}$ given the matrix A and the PDOA vector $\vec{\Phi}$. The unit vector $\vec{u}$ can be found using Eq. 4:

$$\vec{u} = A^+ \cdot \vec{\Phi} = \left(A^T A\right)^{-1} A^T \cdot \vec{\Phi} \qquad \text{(Eq. 4)}$$

When $L \geq \lambda/2$, the measured PDOA includes multiple "unwrapped" angles. Here, the symbol $\Phi$ is used to refer to unwrapped PDOAs, and the symbol $\varphi$ is used to refer to wrapped PDOAs. Wrapped PDOAs $\varphi_i$ include angles that are measured and that are in the $(-\pi, \pi)$ range. The corresponding unwrapped PDOAs $\Phi_i$ may include angles outside of the $(-\pi, \pi)$ range. The relationship between wrapped and unwrapped PDOAs may be expressed as a mod(•) function in Equation 5 and as a vector in Equation 6:

$$\varphi_i = \text{wrap}(\Phi_i) = ((\Phi_i + \pi) \bmod (2\pi)) - \pi \qquad \text{(Eq. 5)}$$

$$\vec{\varphi} = \begin{bmatrix} \varphi_1 \\ \varphi_2 \\ \cdots \\ \varphi_N \end{bmatrix} = \begin{bmatrix} \text{wrap}(\Phi_1) \\ \text{wrap}(\Phi_2) \\ \cdots \\ \text{wrap}(\Phi_N) \end{bmatrix} = \text{wrap} \begin{bmatrix} \Phi_1 \\ \Phi_2 \\ \cdots \\ \Phi_N \end{bmatrix} = \text{wrap}(\vec{\Phi}) \qquad \text{(Eq. 6)}$$

For a given wrapped PDOA $\varphi_1$, there are multiple unwrapped PDOAs $\Phi_i$ that are consistent with the same wrapped PDOAs or Only one of the multiple unwrapped PDOAs $\Phi_i$ is the true PDOA, i.e., that correctly matches the value of the wrapped PDOA $\varphi_1$.

Examples for resolving angle ambiguities and determining the true PDOA, where a separation L between two antennas of the UE 105 is greater than or equal to $\lambda/2$, may be based on comparisons of PDOA measurements obtained for different orientations of the UE 105. Once the angle ambiguities are resolved, and the true PDOA is determined, the true PDOA may be used to determine a location of the target object 102.

FIG. 6 illustrates a flow diagram of a method 600 for determining a true PDOA, where a separation L between two antennas of the UE 105 is greater than or equal to $\lambda/2$. The method 600 is, however, an example only and not limiting. The method 600 may be altered, e.g., by having one or more stages added, removed, rearranged, combined, performed concurrently, and/or by having one or more single stages split into multiple stages.

At stage 610, the method 600 includes determining a plurality of candidate unwrapped PDOAs for a signal transmitted by a target object 102 and received by at least a first antenna 246 and a second antenna 250 of the UE 105, where the plurality of candidate unwrapped PDOAs corresponds to a plurality of orientations of the UE 105, where a separation distance between the first antenna 246 and the second antenna 250 is greater than or equal to half of the wavelength $\lambda$ of the signal. The one or more processors 210, possibly in combination with the memory 211, may comprise means for determining the plurality of candidate unwrapped PDOAs for the signal transmitted by the target object and received by at least the first antenna and the second antenna of the UE.

At stage 620, the method 600 includes comparing the plurality of candidate unwrapped PDOAs. The one or more processors 210, possibly in combination with the memory 211, may comprise means for comparing the plurality of candidate unwrapped PDOAs.

At stage 630, the method 600 includes identifying a true PDOA based on the comparison. The one or more processors 210, possibly in combination with the memory 211, may comprise means for identifying the true PDOA based on the comparison.

Referring to FIG. 7, in a first example implementation of the method 600, the comparison of the plurality of candidate unwrapped PDOAs leverages the fact that the AOA ambiguity will diverge over rotations of the UE 105, while the true AOA will converge. The method 700, shown in FIG. 7, is an example only and not limiting. The method 700 may be altered, e.g., by having one or more stages added, removed, rearranged, combined, performed concurrently, and/or by having one or more single stages split into multiple stages.

At stage 710, the method 700 incudes determining the plurality of candidate unwrapped PDOAs for the signal transmitted by the target object 102 and received by at least the first antenna 246 and the second antenna 250 of the UE 105, where the plurality of candidate unwrapped PDOAs includes a first subset of unwrapped PDOAs corresponding to a first wrapped PDOA and a second subset of unwrapped PDOAs corresponding to a second wrapped PDOA, where the first wrapped PDOA corresponds to a first orientation of the UE 105 and the second wrapped PDOA corresponds to a second orientation of the UE 105, where the separation distance between the first antenna 246 and the second antenna 250 is greater than or equal to half of the wavelength of the signal. The one or more processors 210, possibly in combination with the memory 211, may comprise means for determining the plurality of candidate unwrapped PDOAs for the signal transmitted by the target object and received by at least the first antenna 246 and the second antenna 250 of the UE 105. The method 700 may be applied to UE's with three or more antennas with separation distances L between each pair of two antennas being greater than or equal to $\lambda/2$.

At stage 720, the method 700 includes determining a first subset of candidate AOAs corresponding to the first subset of candidate unwrapped PDOAs and a second subset of candidate AOAs corresponding to the second subset of candidate unwrapped PDOAs. The one or more processors 210, possibly in combination with the memory 211, may comprise means for determining the first subset of candidate AOAs corresponding to the first subset of candidate unwrapped PDOAs and a second subset of candidate AOAs corresponding to the second subset of candidate unwrapped PDOAs.

At stage 730, the method 700 includes determining a plurality of divergences between the second subset of candidate AOAs and the corresponding first subset of candidate AOAs. The one or more processors 210, possibly in combination with the memory 211, may comprise means for determining the plurality of divergences between the second subset of candidate AOAs and the corresponding first subset of candidate AOAs.

At stage 740, the method 700 includes identifying one or more of the first subset of candidate AOAs as untrue AOAs based on the plurality of divergences. The one or more processors 210, possibly in combination with the memory 211, may comprise means for identifying the one or more of the first subset of candidate AOAs as untrue AOAs.

At stage 750, the method 700 includes determining a remaining candidate AOA of the first subset of candidate AOAs that has not been identified as an untrue AOA. The one or more processors 210, possibly in combination with the memory 211, may comprise means for determining the remaining candidate AOA of the first subset of candidate AOAs that has not been identified as an untrue AOA.

At stage 760, the method 700 includes identifying the remaining candidate AOA as the true AOA. The one or more processors 210, possibly in combination with the memory 211, may comprise means for identifying the remaining candidate AOA as the true AOA.

For example, referring to FIG. 7, at stage 710, for a first orientation of the UE 105, a first wrapped PDOA $\varphi$ may be measured. The first subset of candidate unwrapped PDOAs corresponding to the first wrapped PDOA $\varphi$ may include $\{\Phi_1, \ldots \Phi_N\}$. At stage 720, the first subset of candidate unwrapped PDOAs $\{\Phi_1, \ldots \Phi_N\}$ are used to compute a first subset of candidate AOA $\{\theta_1, \ldots, \theta_N\}$ using Equation 2. The UE 105 may then be rotated at an angle of rotation t as measured by one or more of the sensors 213 of the UE 105 to a second orientation. At stage 710, a second wrapped PDOA $\varphi'$ may be measured. The second subset of candidate unwrapped PDOAs corresponding to the second wrapped PDOA $\varphi'$ may include $\{\Phi'_1, \ldots \Phi'_N\}$. At stage 720, the second subset of candidate unwrapped PDOAs $\{\Phi'_1, \ldots, \Phi'_N\}$ are used to compute a second subset of candidate AOAs $\{\theta'_1, \ldots, \theta'_N\}$ using Equation 2. At stage 730, assuming that the AOA measurements meet an accuracy threshold, the divergences of one or more of the second subset of candidate AOAs $\{\theta'_1, \ldots, \theta'_N\}$ from the first subset of candidate AOAs $\{\theta_1, \ldots, \theta_N\}$ may be defined as $|\Delta\theta_i - \tau|$, where $\Delta\theta_i = \theta'_i - \theta_i$. At stage 720, a candidate AOA (e.g., $\theta_1$) in the first subset of candidate AOAs corresponding to the largest divergence (e.g., $|\Delta\theta_1 - \tau| > |\Delta\theta_2 - \tau|, \ldots, |\Delta\theta_1 - \tau| > \Delta\theta_N - \tau|$) may be determined to be an untrue AOA. If one or more angle ambiguities remain in the first subset of candidate AOAs, then stages 730 and 740 may be repeated for one or more subsequent rotations of the UE 105 to identify more candidate AOAs as untrue AOAs, until, at stage 750, one candidate AOA of the first subset of candidate AOAs remains that has not been identified as an untrue AOA. At stage 760, the one remaining candidate AOA is identified as the true AOA. The true AOA may be used to determine the target direction $\vec{u^*}$ to the target object 102.

With the method 700, for any given L, a non-ambiguity range of angles may be calculated, such that a AOA within the non-ambiguity range of angles is the true AOA. The method 700 may leverage the non-ambiguity range of angles by prompting the user to rotate the UE 105 in a direction that may result in an AOA within the non-ambiguity range of angles. In this manner, the true AOA may be identified with fewer repetitions of stages 730 and 740. The UE 105 may display one or more instructions to change the orientation of the UE 105 by rotating the UE 105 in one or more directions. For example, the target object 102 and the antennas 246, 250 of the UE 105 may reside in a plane. For example, the UE 105 may display one or more instructions to rotate the UE 105 along an axis, while maintaining the target object 102 and the antennas 246, 250 in the plane. For another example, the one or more instructions may include tilting the UE 105 in a first direction from the axis and then in a second and opposite direction from the axis (e.g., "shaking" the UE 105).

Figures 8C, 11A, 11B, 11C:
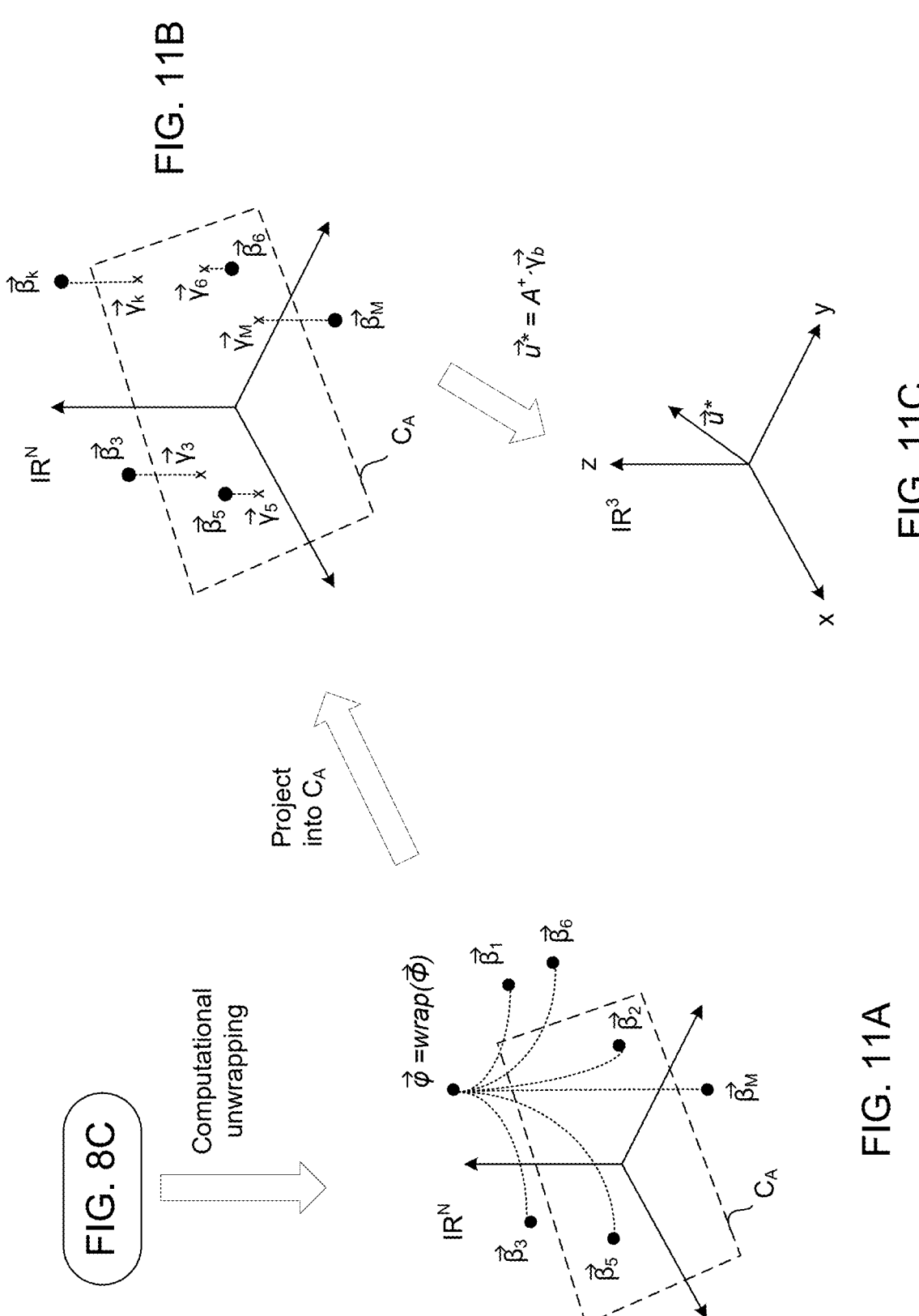

In a second example implementation of the method 600, identification of the true PDOA may be based on a projection of the plurality of unwrapped PDOAs onto a column space of a measurement matrix. FIGS. 8A-8C are diagrams illustrating the projection of unwrapped PDOAs. Referring to FIGS. 8A and 8B, a linear transformation is performed on the unit vector $\vec{u}$ with the measurement matrix A (see Eq. 3) to obtain a vector of unwrapped PDOAs $\vec{\Phi}$, where $\vec{\Phi} = A \cdot \vec{u} \in C_A$. $C_A$ is the column space of A, i.e., the subspace spanned by the columns of the measurement matrix A. Referring to FIGS. 8B and 8C, a wrapping process due to $L \geq \lambda/2$ produces a vector of wrapped PDOA measurements $\vec{\varphi}$. The second example implementation leverages the fact that, although $\vec{\Phi}$ has N components, $\vec{\Phi}$ is restricted to lie in a subspace of dimension three spanned by the columns of A. Because the wrapping is not a linear transformation, the wrapping will produce an output $\vec{\varphi}$, which is likely to be outside of $C_A$.

FIG. 9 is a flow diagram illustrating the second example implementation of the method 600. The method 900 is an example only and not limiting. The method 900 may be altered, e.g., by having one or more stages added, removed, rearranged, combined, performed concurrently, and/or by having one or more single stages split into multiple stages.

At stage 910, the method 900 includes measuring a wrapped PDOA vector for a signal transmitted by a target object 102 and received by at least a first antenna 246 and a second antenna 250 of the UE 105, where the wrapped PDOA vector corresponds to a plurality of orientations of the UE 105, where a separation distance between the first antenna 246 and the second antenna 250 is greater than or equal to half of the wavelength of the signal. The one or more processors 210, possibly in combination with the memory 211, may comprise means for measuring the wrapped PDOA vector for a signal transmitted by a target object 102 and received by at least a first antenna 246 and a second antenna 250 of the UE 105. The method 900 may be applied to UE's with three or more antennas with separation distances L between each pair of two antennas being greater than or equal to $\lambda/2$.

At stage 920, the method 90 includes generating a plurality of candidate unwrapped PDOA vectors based on the measured wrapped PDOA vector. The one or more processors 210, possibly in combination with the memory 211, may comprise means for generating a plurality of candidate unwrapped PDOA vectors based on the measured wrapped PDOA vector.

Figure 10:
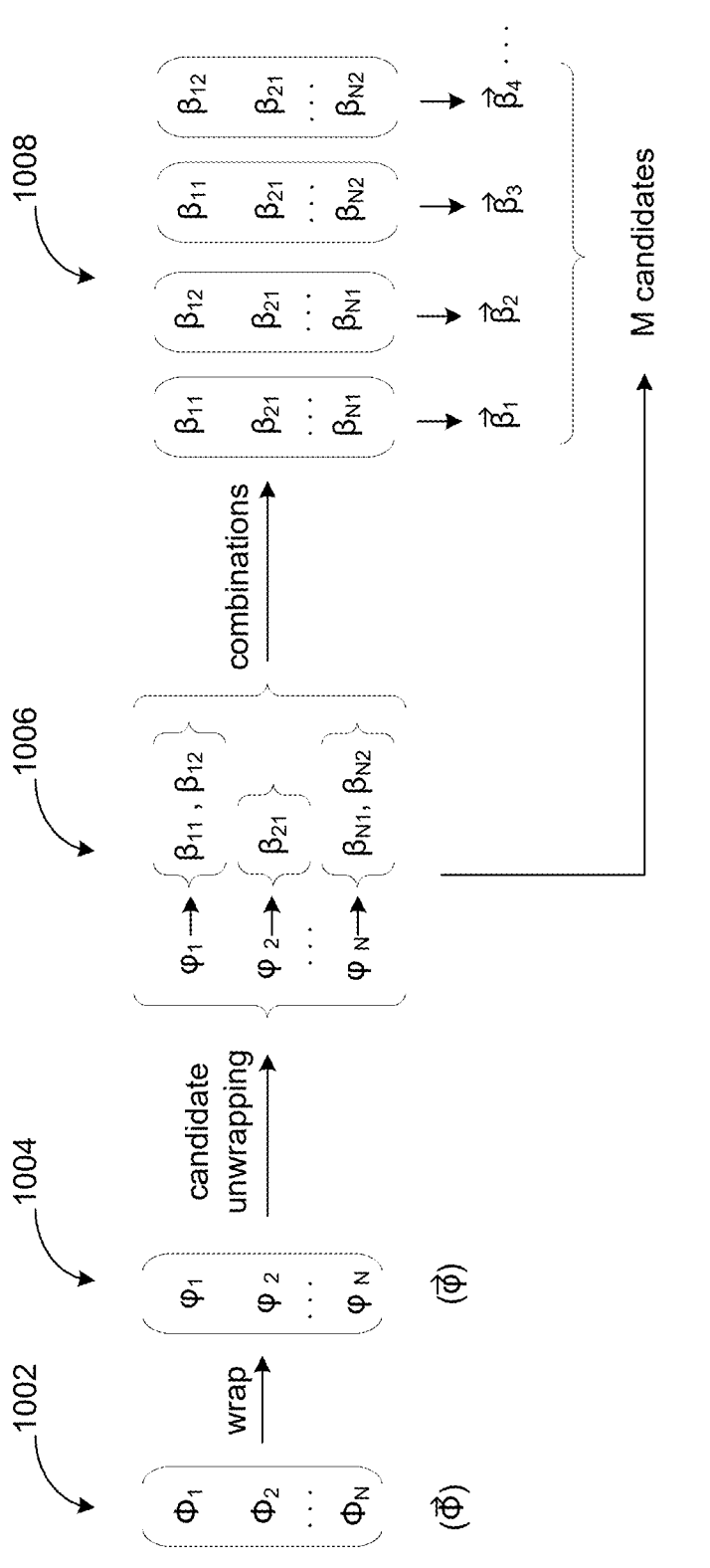
FIG. 10 is a diagram illustrating generation of a list of candidate unwrapped PDOA vectors.

At stage 930, the method 900 includes generating a plurality of projections onto a subspace formed by a column space of a measurement matrix for the plurality of candidate unwrapped PDOA vectors. The one or more processors 210, possibly in combination with the memory 211, may comprise means for generating a plurality of projections onto a subspace formed by a column space of a measurement matrix for the plurality of candidate unwrapped PDOA vectors. For example, referring to FIG. 10, consider a full vector of wrapped PDOAs $\vec{\varphi}$ 1004 (e.g., $\varphi_1, \varphi_2, \ldots, \varphi_N$ each corresponding to an orientation of the UE 105) corresponding a vector $\vec{\Phi}$ 1002. Assume that each component of the vector of wrapped PDOA $\vec{\varphi}$ may be unwrapped into $m_i$ possible angles 1006 ($\beta_{i1}, \ldots, \beta_{im_i}$). Referring to FIG. 11A, a set of candidate unwrapped PDOA vectors $\vec{\beta_k}$ 1008 may be built with the combinations of values for the components of the vector $\vec{\varphi}$. Given N components, where each component may have $m_i$ values, M different candidate unwrapped PDOA vectors 1008 may be produced, where $$M = \prod_{i=1}^{N} \{m_i\}. \text{ For } \vec{\beta_k}, \text{ where } k \in \{1, \ldots, M\},$$

one of the candidate unwrapped PDOA, $\vec{\beta_k}$, will match the true PDOA.

To identify the true PDOA $\vec{\Phi}$, the method 900 leverages the fact that a physically valid PDOA vector $\vec{\Phi}$ must lie in the subspace $C_A$. The candidate unwrapped PDOA vectors $\vec{\beta_k}$ that do not correspond to the true PDOA $\vec{\Phi}$ will be the result of adding integer multiples of $2\pi$ to the components of the true PDOA $\vec{\Phi}$ and will likely be outside of subspace $C_A$. For example, referring to FIG. 11B, building on the projection of the PDOA vector $\vec{\Phi}$ (shown in FIG. 8C), the method 900 generates $\vec{\beta_k}$.

At stage 920, the method 900 includes determining a plurality of distances between the plurality of candidate unwrapped PDOAs and the corresponding plurality of projections onto the subspace. The one or more processors 210, possibly in combination with the memory 211, may comprise means for determining a plurality of distances between the plurality of candidate unwrapped PDOAs and the corresponding plurality of projections onto the subspace. For example, referring to FIG. 11B, each $\vec{\beta_k}$ may be projected onto the subspace $C_A$ to obtain $\{\vec{\gamma_k}\}$, using the projection equation:

$$\vec{\gamma_k} = A(A^T A)^{-1} A^T \cdot \vec{\beta_k} \tag{Eq. 7}$$

A plurality of distances between $\vec{\beta_k}$ and $\vec{\gamma_k}$ (i.e., $\{\|\vec{\beta_k} - \vec{\gamma_k}\|\}$) may be determined.

At stage 950, the method 900 includes identifying the candidate unwrapped PDOA vectors of the plurality of candidate unwrapped PDOA vectors corresponding to a smallest distance of the plurality of distances as the true PDOA vector. The one or more processors 210, possibly in combination with the memory 211, may comprise means for identifying the candidate unwrapped PDOA vector of the plurality of candidate unwrapped PDOA vectors corresponding to a smallest distance of the plurality of distances as the true PDOA vector. For example, referring to FIG. 11B, a candidate $\vec{\beta_b}$ closest to its corresponding projection $\vec{\gamma_b}$ (e.g., $\vec{\beta_6}$ and its corresponding projection $\vec{\gamma_6}$) is identified as the true PDOA $\vec{\Phi}$ vector. Referring to FIG. 11C, the target direction to the target object 102 may then be determined using $\vec{u^*} = A^+ \cdot \vec{\gamma_b}$.

A third example implementation of identifying the true PDOA includes a variation of the method 900. In the third example implementation, the comparison of the plurality of candidate unwrapped PDOA vectors may be based on a projection of the unwrapped PDOA vectors on an ellipsoid residing in the column space of a measurement matrix. The third example implementation leverages the fact that $$\vec{u} \in S_1^3$$

(S is a sphere of unit radius in a 3-dimensional space $R^3$) and thus, $\vec{\Phi} = A \cdot \vec{u}$ lies on the ellipsoid given by $$E_A = A \cdot S_1^3$$

(the ellipsoid in $R^N$ formed by the linear transformation of all points in $$S_1^3$$

using matrix A).

FIG. 12 is a flow diagram illustrating the third example implementation of the method 600. The method 1200 is an example only and not limiting. The method 1200 may be altered, e.g., by having one or more stages added, removed, rearranged, combined, performed concurrently, and/or by having one or more single stages split into multiple stages.

At stage 1210, the method 1200 includes measuring a wrapped PDOA vector for a signal transmitted by a target object 102 and received by at least a first antenna 246 and a second antenna 250 of the UE 105, where the wrapped PDOA vector corresponds to a plurality of orientations of the UE 105, where a separation distance between the first antenna 246 and the second antenna 250 is greater than or equal to half of the wavelength of the signal. The one or more processors 210, possibly in combination with the memory 211, may comprise means for measuring a wrapped PDOA vector for a signal transmitted by a target object 102 and received by at least a first antenna 246 and a second antenna 250 of the UE 105.

At stage 1220, the method 1200 includes generating a plurality of candidate unwrapped PDOA vectors based on the measured wrapped PDOA vector. The one or more processors 210, possibly in combination with the memory 211, may comprise means for generating a plurality of candidate unwrapped PDOA vectors based on the measured wrapped PDOA vector.

At stage 1230, the method 1200 includes generating a plurality of projections onto an ellipsoid residing in the subspace formed by a column space of the measurement matrix for the plurality of candidate unwrapped PDOA vectors. The one or more processors 210, possibly in combination with the memory 211, may comprise means for generating the plurality of projections onto the ellipsoid residing in the subspace formed by a column space of the measurement matrix for the plurality of candidate unwrapped PDOA vectors. The ellipsoid may result from applying the measurement matrix to a unit sphere in three dimensional space.

At stage 1240, the method 1200 includes determining a plurality of distances between the plurality of candidate unwrapped PDOA vectors and the corresponding plurality of projections onto the ellipsoid. The one or more processors 210, possibly in combination with the memory 211, may comprise means for determining the plurality of distances between the plurality of candidate unwrapped PDOA vectors and the corresponding plurality of projections onto the ellipsoid.

At stage 1250, the method 1200 includes identifying the candidate unwrapped PDOA vector of the plurality of candidate unwrapped PDOA vectors corresponding to a smallest distance of the plurality of distances as the true PDOA vector. The one or more processors 210, possibly in combination with the memory 211, may comprise means for identifying the candidate unwrapped PDOA vector of the plurality of candidate PDOA vectors corresponding to the smallest distance of the plurality of distances as the true PDOA vector.

Figure 13:
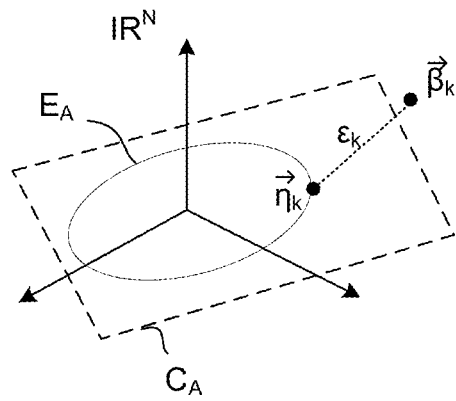
FIGS. 13 and 14 are diagrams illustrating projections of candidate unwrapped PDOA vectors onto an ellipsoid residing within a subspace.

For example, referring to FIG. 13, the projection of $\vec{\beta}_k$ onto an ellipsoid $E_A$ is given by $\vec{\eta}_k$. A list of M candidate unwrapped PDOA vectors $\{\vec{\beta}_k\}$ may be generated, in the same manner as above with reference to method 900. At stage 1210, each $\vec{\beta}_k$ is projected onto the ellipsoid $E_A$ using projection function $\mu_A(\bullet)$ to obtain $\{\vec{\eta}_k\}$:

$$\vec{\eta_k} = \mu_A(\vec{\beta_k}) \qquad \text{(Eq. 8)}$$

At stage 1220, the distance between each $\vec{\beta}_k$ and its corresponding projection may be calculated:

$$\varepsilon_k = \left\| \vec{\eta_k} - \vec{\beta_k} \right\| \qquad \text{(Eq. 9)}$$

At stage 1230, the k with the lowest distance $\varepsilon_k$, i.e., the candidate $\vec{\beta}_k$ closest to the ellipsoid $E_A$, may be selected. The original $\vec{u}$ may be obtained based on a pseudoinverse A+:

$$k_o = \underset{k}{\operatorname{argmin}} \{\varepsilon_k\} \qquad \text{(Eq. 10)}$$

$$\vec{u^*} = A^+ \cdot \vec{\eta_{k_o}} \qquad \text{(Eq. 11)}$$

Figure 14:
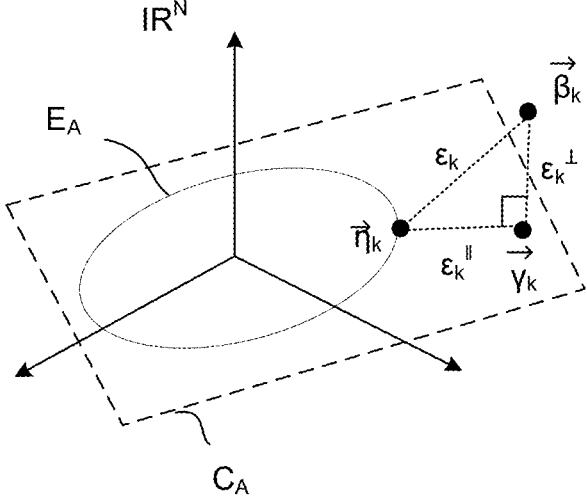

Referring to FIG. 14, the projection of $\vec{\beta}_k$ onto the subspace $C_A$ is given by $\vec{\gamma}_k$. The error vector $\varepsilon^{\|} = \vec{\gamma_k} - \vec{\eta_k}$ is in subspace $C_A$, while the error vector $$\varepsilon_k^J = \vec{\beta_k} - \vec{\gamma_k}$$

is orthogonal to subspace $C_A$. Thus, $\varepsilon^{\|}$ and $$\varepsilon_k^J$$

are orthogonal to each other. By applying the Pythagorean theorem, the distance between $\vec{\beta}_k$ and its corresponding projection $\vec{\eta}_k$ onto the ellipsoid $E_A$ is:

$$\|\varepsilon_k\| = \left\| \vec{\beta_k} - \vec{\eta_k} \right\| = \sqrt{ \left\| \vec{\beta_k} - \vec{\gamma_k} \right\|^2 + \left\| \vec{\gamma_k} - \vec{\eta_k} \right\|^2 } \qquad \text{(Eq. 12)}$$

Figure 15:
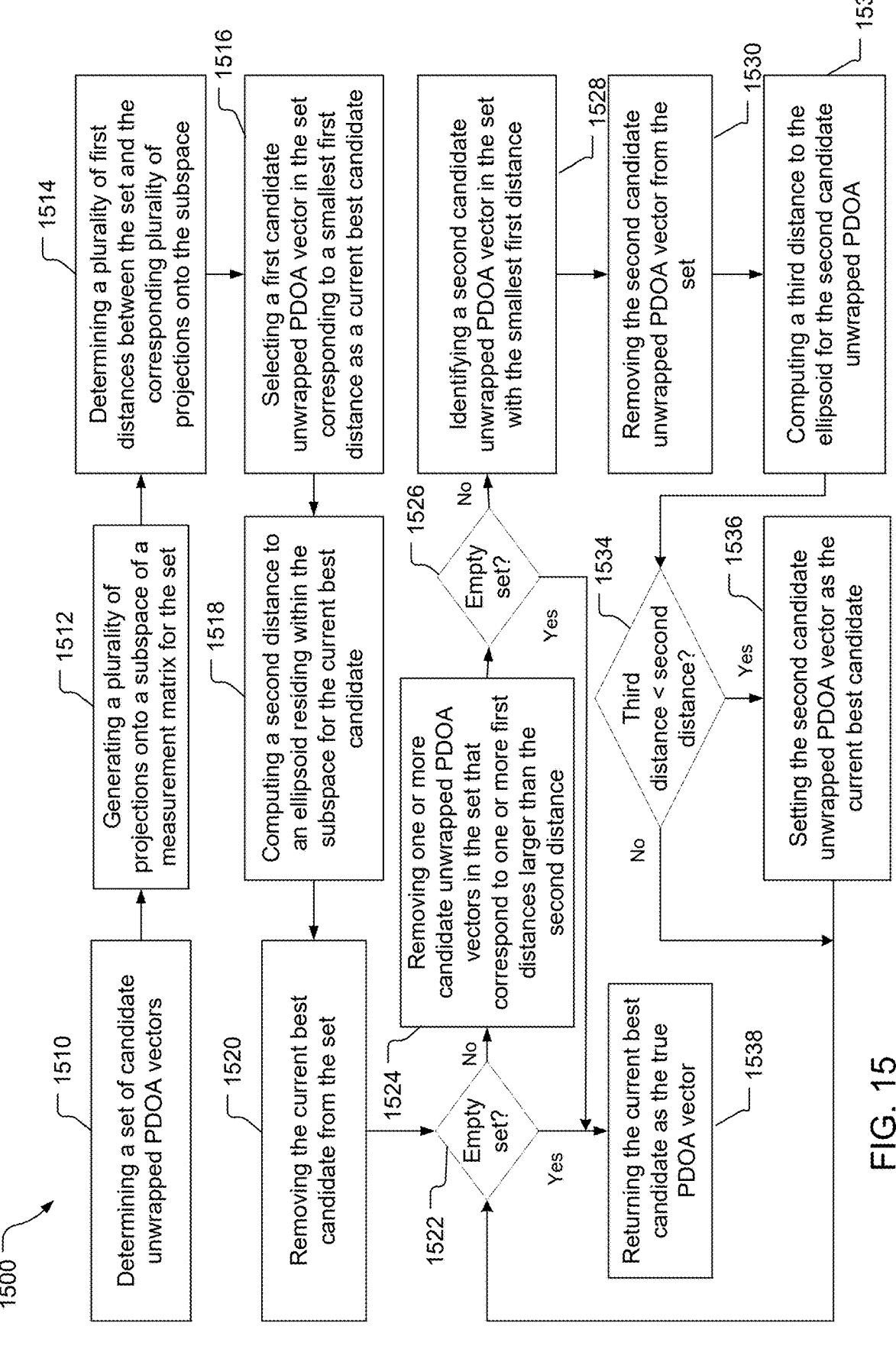
FIG. 15 is a flow diagram illustrating a fourth example implementation of identifying the true PDOA.

The computing resources required to obtain the distance $\varepsilon_k$ may be computationally expensive. In a fourth example implementation of identifying the true PDOA vector, a variation of the method 1200 avoids the requirement to compute the distance $\|\varepsilon_k\|$ for each $\vec{\beta}_k$. FIG. 15 is a flow diagram illustrating the fourth example implementation of the method 600. The method 1500 is an example only and not limiting. The method 1500 may be altered, e.g., by having one or more stages added, removed, rearranged, combined, performed concurrently, and/or by having one or more single stages split into multiple stages.

At stage 1510, the method includes determining a set of candidate unwrapped PDOA vectors corresponding to one or more wrapped PDOA vectors. The set of candidate unwrapped PDOA vectors may include the plurality of candidate unwrapped PDOA vectors referenced in FIG. 10. The one or more processors 210, possibly in combination with the memory 211, may comprise means for determining the set of candidate unwrapped PDOAs.

At stage 1512, the method 1500 includes generating a plurality of projections onto a subspace of a measurement matrix for the set of candidate unwrapped PDOA vectors. The one or more processors 210, possibly in combination with the memory 211, may comprise means for generating the plurality of projections onto the subspace of the measurement matrix for the set of candidate unwrapped PDOA vectors.

At stage 1514, the method 1500 includes determining a plurality of first distances between the set of candidate unwrapped PDOA vectors and the corresponding plurality of projections onto the subspace. The one or more processors 210, possibly in combination with the memory 211, may comprise means for determining the plurality of first distances between the set of candidate unwrapped PDOA vectors and the corresponding plurality of projections onto the subspace.

At stage 1516, the method 1500 includes selecting a first candidate unwrapped PDOA vector in the set of candidate unwrapped PDOA vectors corresponding to a smallest first distance as a current best candidate. The one or more processors 210, possibly in combination with the memory 211, may comprise means for selecting a first candidate unwrapped PDOA vector in the set of candidate unwrapped PDOA vectors corresponding to a smallest first distance as a current best candidate.

At stage 1518, the method 1500 includes computing a second distance to an ellipsoid residing within the subspace for the current best candidate. The one or more processors 210, possibly in combination with the memory 211, may comprise means for computing a second distance to an ellipsoid residing within the subspace for the current best candidate. The ellipsoid may result from applying the measurement matrix to a unit sphere in three dimensional space.

At stage 1520, the method 1500 includes removing the current best candidate from the set of candidate unwrapped PDOA vectors. The one or more processors 210, possibly in combination with the memory 211, may comprise means for removing the current best candidate from the set of candidate unwrapped PDOA vectors.

At stage 1522, the method 1500 includes determining whether the set of candidate unwrapped PDOA vectors is empty. The one or more processors 210, possibly in combination with the memory 211, may comprise means for determining whether the set of candidate unwrapped PDOA vectors is empty.

At stage 1524, if the set is not empty, the method 1500 includes removing one or more candidate unwrapped PDOA vectors in the set of candidate unwrapped PDOA vectors that correspond to one or more first distances larger than the second distance. The one or more processors 210, possibly in combination with the memory 211, may comprise means for, removing one or more candidate unwrapped PDOAs in the set of candidate unwrapped PDOA vectors that correspond to one or more first distances larger than the second distance. By removing candidate unwrapped PDOAs with first distances larger than the second distance, the computing of the projections to the ellipsoid is avoided for the removed candidates. The projections onto the subspace are thus used to filter out candidates in the set of unwrapped PDOA vectors that are less likely than the current best candidate to be the true PDOA vector.

At stage 1526, the method 1500 includes determining whether the set of candidate unwrapped PDOA vectors is empty. The one or more processors 210, possibly in combination with the memory 211, may comprise means for determining whether the set of candidate unwrapped PDOA vectors is empty.

At stage 1528, if the set is not empty, the method 1500 includes identifying a second candidate unwrapped PDOA vector in the set of candidate unwrapped PDOA vectors with the smallest first distance. The one or more processors 210, possibly in combination with the memory 211, may comprise means for identifying a second candidate unwrapped PDOA vector in the set of candidate unwrapped PDOA vectors with the smallest first distance.

At stage 1530, the method 1500 includes removing the second candidate from the set of candidate unwrapped PDOA vectors. The one or more processors 210, possibly in combination with the memory 211, may comprise means for removing the second candidate from the set of candidate unwrapped PDOA vectors.

At stage 1532, the method 1500 includes computing a third distance to the ellipsoid for the second candidate unwrapped PDOA vector. The one or more processors 210, possibly in combination with the memory 211, may comprise means for computing a third distance to the ellipsoid for the second candidate unwrapped PDOA vector.

At stage 1534, the method 1500 includes determining whether the third distance is smaller than the second distance. The one or more processors 210, possibly in combination with the memory 211, may comprise means for determining whether the third distance is smaller than the second distance.

At stage 1536, if the third distance is smaller than the second distance, then the method 1500 includes setting the second candidate unwrapped PDOA vector as the current best candidate. The one or more processors 210, possibly in combination with the memory 211, may comprise means for setting the second candidate unwrapped PDOA vector as the current best candidate. If the third distance is not smaller than the second distance, the first candidate remains the current best candidate.

After stages 1534 and 1536, the method 1500 repeats stages 1522 through 1536 until the set of unwrapped candidate PDOA vectors is determined to be empty.

At stage 1538, when the set of candidate unwrapped PDOA vectors is empty, the method 1500 includes returning the current best candidate as the true PDOA vector. The one or more processors 210, possibly in combination with the memory 211, may comprise means for returning the current best candidate as the true PDOA vector.

For example, referring again to FIG. 14, at stage 1510, for a set of unwrapped PDOAs, $G=\{\vec{\beta_1}, \ldots, \vec{\beta_M}\}$, a set of indices, $M:=\{1, \ldots, M\}$, for the set G may be built. At stage 1512, projections $\{\vec{\gamma_1}, \ldots, \vec{\gamma_M}\}$ onto the subspace $C_A$ for the set G may be generated. At stage 1514, the distances between the set G and the corresponding projections $\{\vec{\gamma_1}, \ldots, \vec{\gamma_M}\}$ may be computed:

$$\varepsilon_k^\perp = \left\| \vec{\beta_k} - \vec{\gamma_k} \right\| \text{ for all } k \in M \qquad \text{(Eq. 13)}$$

At stage 1516, the shortest distance to the subspace $C_A$ may be selected as the current best candidate. Assume that index b is determined to be $$b = \mathrm{argmin}_{k \in M} \{\varepsilon_k^J\}.$$

At stage 1518, the distance to the ellipsoid $E_A$ may be computed for the candidate corresponding to index b:

$$\varepsilon_b = \left\| \vec{\beta_b} - \vec{\eta_b} \right\| \qquad \text{(Eq. 14)}$$

At stage 1520, the index b is then removed from M. At stages 1522 and 1524, if M is not empty, any other candidates corresponding to distances to the subspace $C_A$ that is larger than the distance for the candidate corresponding to index b may be removed from M, i.e., k is removed from $$M \text{ if } \varepsilon_k^J \geq \varepsilon_b.$$

At stages 1526 and 1528, if M is not empty, from the remaining candidates in M, the candidate with the lowest $$\varepsilon_k^J$$

may be identified. Assume that this candidate has index c. At stage 1530, index c may be removed from M.

At stage 1532, the distance to the ellipsoid for the candidate corresponding to index c may be computed:

$$\varepsilon_c = \left\| \vec{\beta_c} - \vec{\eta_c} \right\|$$ (Eq. 15)

At stages 1534 and 1536, if $\varepsilon_c < \varepsilon_b$, then b:=c. Stages 1522 through 1536 may be repeated until M is empty. At stage 1538, once M is empty, $\vec{\beta_b}$ is returned as the candidate closest to the ellipsoid $E_A$, and $\vec{\eta_b}$ is returned as its corresponding projection onto the ellipsoid $E_A$. In this manner, the number of candidates for which the distance to the ellipsoid $E_A$ is computed may be reduced, saving computing resources.

The true PDOA vector identified based on the methods above may be used to determine a location of the target object 102 by the UE 105. The method for determining the location of the target object 102 may use a phase delay in combination with other values (e.g., a corresponding position of the UE 105, an orientation of the UE 105, and a distance between the position of the UE 105 and the target object 102). The method may determine the location of the target object 102 by building a loss function using the combination of values, accepting candidate positions of the target object 102 into the loss function, obtaining an output value for the loss function, and finding a candidate position for the target object 102 that produces the lowest output value for the loss function (i.e., minimizing the loss function). For example, a gradient descent method may be used to minimize the loss function. An initial estimate of the location of the target object 102 may be determined using the true PDOA vector. This initial estimate may be used as an initial location in the gradient descent, which may reduce the number of iterations in the gradient descent method to find the lowest output value for the loss function, which in turn saves computing resources. Further, when the loss function includes a global minimum and several local minima, by using the initial estimate determined based on the true PDOA vector, the possibility of converging at a local minimum instead of the global minimum may be reduced.

Figure 16:
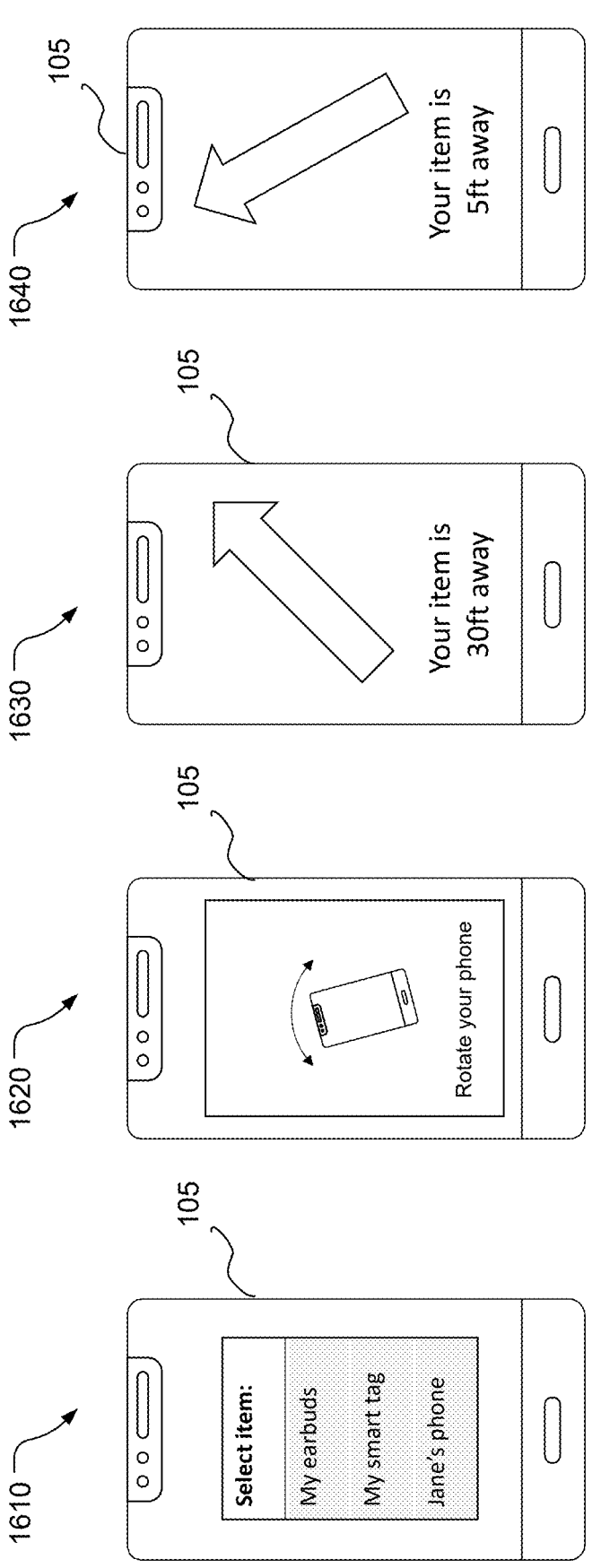
FIG. 16 illustrates an example user experience in locating the target object.

FIG. 16 illustrates an example user experience in locating the target object 102. In this example, the UE 105 is a mobile device with one or more processors (e.g., the processor(s) 210) executing an application (e.g., the software 212) stored in one or more memories (e.g., the memories 211). A user of the UE 105 executes the application, and the application displays an image 1610, on the user interface of the UE 105, that provides a list of items that support wireless ranging signals. The user selects one of the items as the target object 102. In response to receiving the selection of the target object 102, the application executing on the UE 105 causes a communication link between the transceivers of the UE 105 and the target object 102 to be established (e.g., between the transceivers 240, 320). The application displays an image 1620 on the user interface with instructions for the user to rotate the UE 105 in order to change the orientation of the UE 105. Optionally, the user interface may instruct the user to rotate the UE 105 in a direction most likely to result in a PDOA within the non-ambiguity range of angles. As the UE 105 changes orientations, the application executes the method 600 as described above and calculates the position of the target object 102. The application causes directional information to be displayed on the user interface as an image 1630 based on the position of the target object 102 and the orientation of the UE 105. As the user continues to change orientations of the UE 105, the position of the target object 102 is updated. The application displays updated directional information in an image 1640 based on the updated position of the target object 102 and an updated orientation of the UE 105.

Implementation Examples

Clause 1. A method for determining a true phase difference of arrival (PDOA), comprising: determining a plurality of candidate unwrapped PDOAs for a signal transmitted by a target object and received by at least a first antenna and a second antenna of a user equipment (UE), wherein the plurality of candidate unwrapped PDOAs corresponds to a plurality of orientations of the UE, wherein a separation distance between the first antenna and the second antenna is greater than or equal to half of a wavelength of the signal; comparing the plurality of unwrapped candidate PDOAs; and identifying the true PDOA based on the comparison.

Clause 2. The method of claim 1, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the comparing of the plurality of unwrapped candidate PDOAs, comprises: determining a first subset of candidate angle of arrivals (AOAs) corresponding to the first subset of candidate unwrapped PDOAs and a second subset of candidate AOAs corresponding to the second subset of candidate unwrapped PDOAs; determining a plurality of divergences between the second subset of candidate AOAs and the corresponding first subset of candidate AOAs; identifying one or more of the first subset of candidate AOAs as untrue AOAs based on the plurality of divergences; determining a remaining candidate AOA of the first subset of candidate AOAs that has not been identified as an untrue AOA; and identifying the remaining candidate AOA as a true AOA.

Clause 3. The method of clause 2, further comprising: displaying one or more user instructions to change an orientation of the UE by rotating the UE in one or more directions.

Clause 4. The method of clause 3, wherein the one or more user instructions comprise one or more user instructions to rotate the UE along an axis while maintaining the target object and at least the first antenna and the second antenna in a plane.

Clause 5. The method of clause 3, wherein the one or more user instructions comprise one or more user instructions to tilt the UE in a first direction from an axis and in a second direction from the axis.

Clause 6. The method of clause 1, wherein the determining of the plurality of candidate unwrapped PDOAs for the signal, the comparing of the plurality of unwrapped candidate PDOAs, and the identifying of the true PDOA based on the comparison, comprise: measuring a wrapped PDOA vector for the signal, wherein the wrapped PDOA corresponds to the plurality of orientations of the UE; generating a plurality of candidate unwrapped PDOA vectors based on the measured wrapped PDOA vector; generating a plurality of projections onto a subspace formed by a column space of a measurement matrix for the plurality of candidate unwrapped PDOA vectors; determining a plurality of distances between the plurality of candidate unwrapped PDOA vectors and the corresponding plurality of projections onto the subspace; and identifying the candidate unwrapped PDOA vector of the plurality of candidate unwrapped PDOA vectors corresponding to a smallest distance of the plurality of distances as a true PDOA vector.

Clause 7. The method of clause 6, wherein the generating of the plurality of projections onto the subspace and the determining of the plurality of distances between the plurality of candidate unwrapped PDOA vectors and the corresponding plurality of projections onto the subspace, comprise: generating the plurality of projections onto an ellipsoid residing in the subspace formed by the column space of the measurement matrix for the plurality of candidate unwrapped PDOA vectors, wherein the ellipsoid results from applying the measurement matrix to a unit sphere in a three dimensional space; and determining the plurality of distances between the plurality of candidate unwrapped PDOA vectors and the corresponding plurality of projections onto the ellipsoid.

Clause 8. The method of clause 6, wherein a set of candidate unwrapped PDOA vectors comprises the plurality of candidate unwrapped PDOA vectors, wherein the plurality of distances comprises a plurality of first distances between the set of candidate unwrapped PDOA vectors and the corresponding plurality of projections onto the subspace, wherein the identifying of the true PDOA vector comprises: selecting a first candidate unwrapped PDOA vector in the set of candidate unwrapped PDOA vectors corresponding to a smallest first distance as a current best candidate; computing a second distance to an ellipsoid residing within the subspace for the current best candidate, wherein the ellipsoid results from applying the measurement matrix to a unit sphere in a three dimensional space; and removing the current best candidate from the set of candidate unwrapped PDOA vectors.

Clause 9. The method of clause 8, wherein if the set of candidate unwrapped PDOA vectors is not empty, the identifying of the true PDOA vector further comprises: removing one or more candidate unwrapped PDOA vectors in the set of candidate unwrapped PDOA vectors that correspond to one or more first distances larger than the second distance; and if the set of candidate unwrapped PDOA vectors is not empty, identifying a second candidate unwrapped PDOA vector in the set of candidate unwrapped PDOA vectors with the smallest first distance; removing the second candidate unwrapped PDOA vector from the set of candidate unwrapped PDOA vectors; computing a third distance to the ellipsoid for the second candidate unwrapped PDOA vector; determining whether the third distance is less than the second distance; and setting the second candidate unwrapped PDOA vector as the current best candidate if the third distance is less than the second distance.

Clause 10. The method of clause 9, wherein if the set of candidate unwrapped PDOA vectors is empty, returning the current best candidate as the true PDOA vector.

Clause 11. The method of clause 1, further comprising: calculating a direction between the UE and the target object based on the true PDOA.

Clause 12. The method of clause 1, further comprising: determining the plurality of orientations of the UE based on one or more measurements from one or more sensors of the UE.

Clause 13. A user equipment (UE), comprising: a first antenna; a second antenna; one or more memories; and one or more processors communicatively coupled to the one or more memories, the one or more processors being configured to: determine a plurality of candidate unwrapped phase difference of arrivals (PDOAs) for a signal transmitted by a target object and received by at least the first antenna and the second antenna, wherein the plurality of candidate unwrapped PDOAs corresponds to a plurality of orientations of the UE, wherein a separation distance between the first antenna and the second antenna is greater than or equal to half of a wavelength of the signal; compare the plurality of unwrapped candidate PDOAs; and identify a true PDOA based on the comparison.

Clause 14. The UE of clause 13, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the one or more processors configured to compare the plurality of unwrapped candidate PDOAs being further configured to: determine a first subset of candidate angle of arrivals (AOAs) corresponding to the first subset of candidate unwrapped PDOAs and a second subset of candidate AOAs corresponding to the second subset of candidate unwrapped PDOAs; determine a plurality of divergences between the second subset of candidate AOAs and the corresponding first subset of candidate AOAs; identify one or more of the first subset of candidate AOAs as untrue AOAs based on the plurality of divergences; determine a remaining candidate AOA of the first subset of candidate AOAs that has not been identified as an untrue AOA; and identify the remaining candidate AOA as a true AOA.

Clause 15. The UE of clause 14, wherein the one or more processors being further configured to: display one or more user instructions to change an orientation of the UE by rotating the UE in one or more directions.

Clause 16. The UE of clause 15, wherein the one or more user instructions comprise one or more user instructions to rotate the UE along an axis while maintaining the target object and at least the first antenna and the second antenna in a plane.

Clause 17. The UE of clause 15, wherein the one or more user instructions comprise one or more user instructions to tilt the UE in a first direction from an axis and in a second direction from the axis.

Clause 18. The UE of clause 13, wherein the one or more processors configured to determine the plurality of candidate unwrapped PDOAs for the signal, compare the plurality of unwrapped candidate PDOAs, and identify the true PDOA based on the comparison, being further configured to: measure a wrapped PDOA vector for the signal, wherein the wrapped PDOA corresponds to the plurality of orientations of the UE; generate a plurality of candidate unwrapped PDOA vectors based on the measured wrapped PDOA vector; generate a plurality of projections onto a subspace formed by a column space of a measurement matrix for the plurality of candidate unwrapped PDOA vectors; determine a plurality of distances between the plurality of candidate unwrapped PDOA vectors and the corresponding plurality of projections onto the subspace; and identify the candidate unwrapped PDOA vector of the plurality of candidate unwrapped PDOA vectors corresponding to a smallest distance of the plurality of distances as a true PDOA vector.

Clause 19. The UE of clause 18, wherein the one or more processors configured to generate the plurality of projections onto the subspace and determine the plurality of distances between the plurality of candidate unwrapped PDOA vectors and the corresponding plurality of projections onto the subspace, being further configured to: generate the plurality of projections onto an ellipsoid residing in the subspace formed by the column space of the measurement matrix for the plurality of candidate unwrapped PDOA vectors, wherein the ellipsoid results from applying the measurement matrix to a unit sphere in a three dimensional space; and determine the plurality of distances between the plurality of candidate unwrapped PDOA vectors and the corresponding plurality of projections onto the ellipsoid.

Clause 20. The UE of clause 18, wherein a set of candidate unwrapped PDOA vectors comprises the plurality of candidate unwrapped PDOA vectors, wherein the plurality of distances comprises a plurality of first distances between the set of candidate unwrapped PDOA vectors and the corresponding plurality of projections onto the subspace, wherein the one or more processors configured to identify the true PDOA vector being further configured to: select a first candidate unwrapped PDOA vector in the set of candidate unwrapped PDOA vectors corresponding to a smallest first distance as a current best candidate; compute a second distance to an ellipsoid residing within the subspace for the current best candidate, wherein the ellipsoid results from applying the measurement matrix to a unit sphere in a three dimensional space; and remove the current best candidate from the set of candidate unwrapped PDOA vectors.

Clause 21. The UE of clause 20, wherein if the set of candidate unwrapped PDOA vectors is not empty, the one or more processors configured to identify the true PDOA vector being further to: remove one or more candidate unwrapped PDOA vectors in the set of candidate unwrapped PDOA vectors that correspond to one or more first distances larger than the second distance; and if the set of candidate unwrapped PDOA vectors is not empty, identify a second candidate unwrapped PDOA vector in the set of candidate unwrapped PDOA vectors with the smallest first distance; remove the second candidate unwrapped PDOA vector from the set of candidate unwrapped PDOA vectors; compute a third distance to the ellipsoid for the second candidate unwrapped PDOA vector; determine whether the third distance is less than the second distance; and set the second candidate unwrapped PDOA vector as the current best candidate if the third distance is less than the second distance.

Clause 22. The UE of clause 20, wherein if the set of candidate unwrapped PDOA vectors is empty, the one or more processors being further configured to: return the current best candidate as the true PDOA vector.

Clause 23. The UE of clause 13, wherein the one or more processors being further configured to: calculate a direction between the UE and the target object based on the true PDOA.

Clause 24. The UE of clause 13, wherein the one or more processors being further configured to: determine the plurality of orientations of the UE based on one or more measurements from one or more sensors of the UE.

Clause 25. A non-transitory, processor-readable storage medium comprising processor-readable instructions to cause one or more processors to: determine a plurality of candidate unwrapped phase difference of arrivals (PDOAs) for a signal transmitted by a target object and received by at least a first antenna and a second antenna of a user equipment (UE), wherein the plurality of candidate unwrapped PDOAs corresponds to a plurality of orientations of the UE, wherein a separation distance between the first antenna and the second antenna is greater than or equal to half of a wavelength of the signal; compare the plurality of unwrapped candidate PDOAs; and identify a true PDOA based on the comparison.

Clause 26. The medium of clause 25, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the processor-readable instructions to cause the one or more processors to compare the plurality of unwrapped candidate PDOAs further comprise processor-readable instructions to cause the one or more processors to: determine a first subset of candidate angle of arrivals (AOAs) corresponding to the first subset of candidate unwrapped PDOAs and a second subset of candidate AOAs corresponding to the second subset of candidate unwrapped PDOAs; determine a plurality of divergences between the second subset of candidate AOAs and the corresponding first subset of candidate AOAs; identify one or more of the first subset of candidate AOAs as untrue AOAs based on the plurality of divergences; determine a remaining candidate AOA of the first subset of candidate AOAs that has not been identified as an untrue AOA; and identify the remaining candidate AOA as a true AOA.

Clause 27. The medium of clause 26, wherein the processor-readable instructions further cause the one or more processors to: display one or more user instructions to change an orientation of the UE by rotating the UE in one or more directions.

Clause 28. The medium of clause 27, wherein the one or more user instructions comprise one or more user instructions to rotate the UE along an axis while maintaining the target object and at least the first antenna and the second antenna in a plane.

Clause 29. The medium of clause 27, wherein the one or more user instructions comprise one or more user instructions to tilt the UE in a first direction from an axis and in a second direction from the axis.

Clause 30. The medium of clause 25, wherein the processor-readable instructions to cause the one or more processors to determine the plurality of candidate unwrapped PDOAs for the signal, compare the plurality of unwrapped candidate PDOAs, and identify the true PDOA based on the comparison, further comprise processor-readable instructions to cause the one or more processors to: measure a wrapped PDOA vector for the signal, wherein the wrapped PDOA corresponds to the plurality of orientations of the UE; generate a plurality of candidate unwrapped PDOA vectors based on the measured wrapped PDOA vector; generate a plurality of projections onto a subspace formed by a column space of a measurement matrix for the plurality of candidate unwrapped PDOA vectors; determine a plurality of distances between the plurality of candidate unwrapped PDOA vectors and the corresponding plurality of projections onto the subspace; and identify the candidate unwrapped PDOA vector of the plurality of candidate unwrapped PDOA vectors corresponding to a smallest distance of the plurality of distances as a true PDOA vector.

Clause 31. The medium of clause 30, wherein the processor-readable instructions to cause the one or more processors to generate the plurality of projections onto the subspace and determine the plurality of distances between the plurality of candidate unwrapped PDOA vectors and the corresponding plurality of projections onto the subspace, further comprise processor-readable instructions to cause the one or more processors to: generate the plurality of projections onto an ellipsoid residing in the subspace formed by the column space of the measurement matrix for the plurality of candidate unwrapped PDOA vectors, wherein the ellipsoid results from applying the measurement matrix to a unit sphere in a three dimensional space; and determine the plurality of distances between the plurality of candidate unwrapped PDOA vectors and the corresponding plurality of projections onto the ellipsoid.

Clause 32. The medium of clause 30, wherein a set of candidate unwrapped PDOA vectors comprises the plurality of candidate unwrapped PDOA vectors, wherein the plurality of distances comprises a plurality of first distances between the set of candidate unwrapped PDOA vectors and the corresponding plurality of projections onto the subspace, wherein the processor-readable instructions further comprise processor-readable instructions to cause the one or more processors to: select a first candidate unwrapped PDOA vector in the set of candidate unwrapped PDOA vectors corresponding to a smallest first distance as a current best candidate; compute a second distance to an ellipsoid residing within the subspace for the current best candidate, wherein the ellipsoid results from applying the measurement matrix to a unit sphere in a three dimensional space; and remove the current best candidate from the set of candidate unwrapped PDOA vectors.

Clause 33. The medium of clause 32, wherein if the set of candidate unwrapped PDOA vectors is not empty, the processor-readable instructions further comprise processor-readable instructions to cause the one or more processors to: remove one or more candidate unwrapped PDOA vectors in the set of candidate unwrapped PDOA vectors that correspond to one or more first distances larger than the second distance; and if the set of candidate unwrapped PDOA vectors is not empty, identify a second candidate unwrapped PDOA vector in the set of candidate unwrapped PDOA vectors with the smallest first distance; remove the second candidate unwrapped PDOA vector from the set of candidate unwrapped PDOA vectors; compute a third distance to the ellipsoid for the second candidate unwrapped PDOA vector; determine whether the third distance is less than the second distance; and set the second candidate unwrapped PDOA vector as the current best candidate if the third distance is less than the second distance.

Clause 34. The medium of clause 32, wherein if the set of candidate unwrapped PDOA vectors is empty, the processor-readable instructions further comprise processor-readable instructions to cause the one or more processors to: return the current best candidate as the true PDOA vector.

Clause 35. The medium of clause 25, wherein the processor-readable instructions further comprise processor-readable instructions to cause the one or more processors to: calculate a direction between the UE and the target object based on the true PDOA.

Clause 36. The medium of clause 25, wherein the processor-readable instructions further comprise processor-readable instructions to cause the one or more processors to: determine the plurality of orientations of the UE based on one or more measurements from one or more sensors of the UE.

Clause 37. A computing device, comprising: means for determining a plurality of candidate unwrapped phase difference of arrivals (PDOAs) for a signal transmitted by a target object and received by at least a first antenna and a second antenna of a user equipment (UE), wherein the plurality of candidate unwrapped PDOAs corresponds to a plurality of orientations of the UE, wherein a separation distance between the first antenna and the second antenna is greater than or equal to half of a wavelength of the signal; means for comparing the plurality of unwrapped candidate PDOAs; and means for identifying a true PDOA based on the comparison.

Clause 38. The device of clause 37, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein means for comparing the plurality of unwrapped candidate PDOAs, comprises: means for determining a first subset of candidate angle of arrivals (AOAs) corresponding to the first subset of candidate unwrapped PDOAs and a second subset of candidate AOAs corresponding to the second subset of candidate unwrapped PDOAs; means for determining a plurality of divergences between the second subset of candidate AOAs and the corresponding first subset of candidate AOAs; means for identifying one or more of the first subset of candidate AOAs as untrue AOAs based on the plurality of divergences; means for determining a remaining candidate AOA of the first subset of candidate AOAs that has not been identified as an untrue AOA; and means for identifying the remaining candidate AOA as a true AOA.

Clause 39. The device of clause 38, further comprising: means for displaying one or more user instructions to change an orientation of the UE by rotating the UE in one or more directions.

Clause 40. The device of clause 39, wherein the one or more user instructions comprise one or more user instructions to rotate the UE along an axis while maintaining the target object and at least the first antenna and the second antenna in a plane.

Clause 41. The device of clause 39, wherein the one or more user instructions comprise one or more user instructions to tilt the UE in a first direction from an axis and in a second direction from the axis.

Clause 42. The device of clause 37, wherein the means for determining the plurality of candidate unwrapped PDOAs for the signal, comparing the plurality of unwrapped candidate PDOAs, and identifying the true PDOA based on the comparison, comprise: means for measuring a wrapped PDOA vector for the signal, wherein the wrapped PDOA corresponds to the plurality of orientations of the UE; means for generating a plurality of candidate unwrapped PDOA vectors based on the measured wrapped PDOA vector; means for generating a plurality of projections onto a subspace formed by a column space of a measurement matrix for the plurality of candidate unwrapped PDOA vectors; means for determining a plurality of distances between the plurality of candidate unwrapped PDOA vectors and the corresponding plurality of projections onto the subspace; and means for identifying the candidate unwrapped PDOA vector of the plurality of candidate unwrapped PDOA vectors corresponding to a smallest distance of the plurality of distances as a true PDOA vector.

Clause 43. The device of clause 42, wherein the means for generating the plurality of projections onto the subspace and means for determining the plurality of distances between the plurality of candidate unwrapped PDOA vectors and the corresponding plurality of projections onto the subspace, comprise: means for generating the plurality of projections onto an ellipsoid residing in the subspace formed by the column space of the measurement matrix for the plurality of candidate unwrapped PDOA vectors, wherein the ellipsoid results from applying the measurement matrix to a unit sphere in a three dimensional space; and means for determining the plurality of distances between the plurality of candidate unwrapped PDOA vectors and the corresponding plurality of projections onto the ellipsoid.

Clause 44. The device of clause 42, wherein a set of candidate unwrapped PDOA vectors comprises the plurality of candidate unwrapped PDOA vectors, wherein the plurality of distances comprises a plurality of first distances between the set of candidate unwrapped PDOA vectors and the corresponding plurality of projections onto the subspace, wherein the means for identifying the true PDOA vector comprises: means for selecting a first candidate unwrapped PDOA vector in the set of candidate unwrapped PDOA vectors corresponding to a smallest first distance as a current best candidate; means for computing a second distance to an ellipsoid residing within the subspace for the current best candidate, wherein the ellipsoid results from applying the measurement matrix to a unit sphere in a three dimensional space; and means for removing the current best candidate from the set of candidate unwrapped PDOA vectors.

Clause 45. The device of clause 44, wherein if the set of candidate unwrapped PDOA vectors is not empty, the means for identifying the true PDOA vector further comprises: means for removing one or more candidate unwrapped PDOA vectors in the set of candidate unwrapped PDOA vectors that correspond to one or more first distances larger than the second distance; and means for, if the set of candidate unwrapped PDOA vectors is not empty, means for identifying a second candidate unwrapped PDOA vector in the set of candidate unwrapped PDOA vectors with the smallest first distance; means for removing the second candidate unwrapped PDOA vector from the set of candidate unwrapped PDOA vectors; means for computing a third distance to the ellipsoid for the second candidate unwrapped PDOA vector; means for determining whether the third distance is less than the second distance; and means for setting the second candidate unwrapped PDOA vector as the current best candidate if the third distance is less than the second distance.

Clause 46. The device of clause 45, further comprising means for, if the set of candidate unwrapped PDOA vectors is empty, returning the current best candidate as the true PDOA vector.

Clause 47. The device of clause 37, further comprising: means for calculating a direction between the UE and the target object based on the true PDOA.

Clause 48. The device of clause 37, further comprising: means for determining the plurality of orientations of the UE based on one or more measurements from one or more sensors of the UE.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for determining a true phase difference of arrival (PDOA), comprising:

determining a plurality of candidate unwrapped PDOAs for a signal transmitted by a target object and received by at least a first antenna and a second antenna of a user equipment (UE), wherein the plurality of candidate unwrapped PDOAs corresponds to a plurality of orientations of the UE, wherein a separation distance between the first antenna and the second antenna is greater than or equal to half of a wavelength of the signal;

comparing the plurality of unwrapped candidate PDOAs; and identifying the true PDOA based on the comparison.

2. The method of claim 1, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the comparing of the plurality of unwrapped candidate PDOAs, comprises:

determining a first subset of candidate angle of arrivals (AOAs) corresponding to the first subset of candidate unwrapped PDOAs and a second subset of candidate AOAs corresponding to the second subset of candidate unwrapped PDOAs;

determining a plurality of divergences between the second subset of candidate AOAs and the corresponding first subset of candidate AOAs;

identifying one or more of the first subset of candidate AOAs as untrue AOAs based on the plurality of divergences;

determining a remaining candidate AOA of the first subset of candidate AOAs that has not been identified as an untrue AOA; and identifying the remaining candidate AOA as a true AOA.

3. The method of claim 2, further comprising:

displaying one or more user instructions to change an orientation of the UE by rotating the UE in one or more directions.

4. The method of claim 3, wherein the one or more user instructions comprise one or more user instructions to rotate the UE along an axis while maintaining the target object and at least the first antenna and the second antenna in a plane.

5. The method of claim 3, wherein the one or more user instructions comprise one or more user instructions to tilt the UE in a first direction from an axis and in a second direction from the axis.

6. The method of claim 1, wherein the determining of the plurality of candidate unwrapped PDOAs for the signal, the comparing of the plurality of unwrapped candidate PDOAs, and the identifying of the true PDOA based on the comparison, comprise:

measuring a wrapped PDOA vector for the signal, wherein the wrapped PDOA corresponds to the plurality of orientations of the UE;

generating a plurality of candidate unwrapped PDOA vectors based on the measured wrapped PDOA vector;

generating a plurality of projections onto a subspace formed by a column space of a measurement matrix for the plurality of candidate unwrapped PDOA vectors;

determining a plurality of distances between the plurality of candidate unwrapped PDOA vectors and the corresponding plurality of projections onto the subspace; and identifying the candidate unwrapped PDOA vector of the plurality of candidate unwrapped PDOA vectors corresponding to a smallest distance of the plurality of distances as a true PDOA vector.

7. The method of claim 6, wherein the generating of the plurality of projections onto the subspace and the determining of the plurality of distances between the plurality of candidate unwrapped PDOA vectors and the corresponding plurality of projections onto the subspace, comprise:

generating the plurality of projections onto an ellipsoid residing in the subspace formed by the column space of the measurement matrix for the plurality of candidate unwrapped PDOA vectors, wherein the ellipsoid results from applying the measurement matrix to a unit sphere in a three dimensional space; and determining the plurality of distances between the plurality of candidate unwrapped PDOA vectors and the corresponding plurality of projections onto the ellipsoid.

8. The method of claim 6, wherein a set of candidate unwrapped PDOA vectors comprises the plurality of candidate unwrapped PDOA vectors, wherein the plurality of distances comprises a plurality of first distances between the set of candidate unwrapped PDOA vectors and the corresponding plurality of projections onto the subspace, wherein the identifying of the true PDOA vector comprises:

selecting a first candidate unwrapped PDOA vector in the set of candidate unwrapped PDOA vectors corresponding to a smallest first distance as a current best candidate;

computing a second distance to an ellipsoid residing within the subspace for the current best candidate, wherein the ellipsoid results from applying the measurement matrix to a unit sphere in a three dimensional space; and removing the current best candidate from the set of candidate unwrapped PDOA vectors.

9. The method of claim 8, wherein if the set of candidate unwrapped PDOA vectors is not empty, the identifying of the true PDOA vector further comprises:

removing one or more candidate unwrapped PDOA vectors in the set of candidate unwrapped PDOA vectors that correspond to one or more first distances larger than the second distance; and if the set of candidate unwrapped PDOA vectors is not empty, identifying a second candidate unwrapped PDOA vector in the set of candidate unwrapped PDOA vectors with the smallest first distance;

removing the second candidate unwrapped PDOA vector from the set of candidate unwrapped PDOA vectors;

computing a third distance to the ellipsoid for the second candidate unwrapped PDOA vector;

determining whether the third distance is less than the second distance; and setting the second candidate unwrapped PDOA vector as the current best candidate if the third distance is less than the second distance.

10. The method of claim 9, wherein if the set of candidate unwrapped PDOA vectors is empty, returning the current best candidate as the true PDOA vector.

11. The method of claim 1, further comprising:

calculating a direction between the UE and the target object based on the true PDOA.

12. The method of claim 1, further comprising:

determining the plurality of orientations of the UE based on one or more measurements from one or more sensors of the UE.

13. A user equipment (UE), comprising:

a first antenna;

a second antenna;

one or more memories; and one or more processors communicatively coupled to the one or more memories, the one or more processors being configured to:

determine a plurality of candidate unwrapped phase difference of arrivals (PDOAs) for a signal transmitted by a target object and received by at least the first antenna and the second antenna, wherein the plurality of candidate unwrapped PDOAs corresponds to a plurality of orientations of the UE, wherein a separation distance between the first antenna and the second antenna is greater than or equal to half of a wavelength of the signal;

compare the plurality of unwrapped candidate PDOAs; and identify a true PDOA based on the comparison.

14. The UE of claim 13, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the one or more processors configured to compare the plurality of unwrapped candidate PDOAs being further configured to:

determine a first subset of candidate angle of arrivals (AOAs) corresponding to the first subset of candidate unwrapped PDOAs and a second subset of candidate AOAs corresponding to the second subset of candidate unwrapped PDOAs;

determine a plurality of divergences between the second subset of candidate AOAs and the corresponding first subset of candidate AOAs;

identify one or more of the first subset of candidate AOAs as untrue AOAs based on the plurality of divergences;

determine a remaining candidate AOA of the first subset of candidate AOAs that has not been identified as an untrue AOA; and identify the remaining candidate AOA as a true AOA.

15. The UE of claim 13, wherein the one or more processors configured to determine the plurality of candidate unwrapped PDOAs for the signal, compare the plurality of unwrapped candidate PDOAs, and identify the true PDOA based on the comparison, being further configured to:

measure a wrapped PDOA vector for the signal, wherein the wrapped PDOA corresponds to the plurality of orientations of the UE;

generate a plurality of candidate unwrapped PDOA vectors based on the measured wrapped PDOA vector;

generate a plurality of projections onto a subspace formed by a column space of a measurement matrix for the plurality of candidate unwrapped PDOA vectors;

determine a plurality of distances between the plurality of candidate unwrapped PDOA vectors and the corresponding plurality of projections onto the subspace; and identify the candidate unwrapped PDOA vector of the plurality of candidate unwrapped PDOA vectors corresponding to a smallest distance of the plurality of distances as a true PDOA vector.

16. The UE of claim 13, wherein the one or more processors being further configured to:

calculate a direction between the UE and the target object based on the true PDOA.

17. A non-transitory, processor-readable storage medium comprising processor-readable instructions to cause one or more processors to:

determine a plurality of candidate unwrapped phase difference of arrivals (PDOAs) for a signal transmitted by a target object and received by at least a first antenna and a second antenna of a user equipment (UE), wherein the plurality of candidate unwrapped PDOAs corresponds to a plurality of orientations of the UE, wherein a separation distance between the first antenna and the second antenna is greater than or equal to half of a wavelength of the signal;

compare the plurality of unwrapped candidate PDOAs; and identify a true PDOA based on the comparison.

18. The medium of claim 17, wherein the plurality of candidate unwrapped PDOAs comprises a first subset of unwrapped PDOAs corresponding to a first wrapped PDOA and a second subset of unwrapped PDOAs corresponding to a second wrapped PDOA, wherein the first wrapped PDOA corresponds to a first orientation of the UE and the second wrapped PDOA corresponds to a second orientation of the UE, wherein the processor-readable instructions to cause the one or more processors to compare the plurality of unwrapped candidate PDOAs further comprise processor-readable instructions to cause the one or more processors to:

determine a first subset of candidate angle of arrivals (AOAs) corresponding to the first subset of candidate unwrapped PDOAs and a second subset of candidate AOAs corresponding to the second subset of candidate unwrapped PDOAs;

determine a plurality of divergences between the second subset of candidate AOAs and the corresponding first subset of candidate AOAs;

identify one or more of the first subset of candidate AOAs as untrue AOAs based on the plurality of divergences;

determine a remaining candidate AOA of the first subset of candidate AOAs that has not been identified as an untrue AOA; and identify the remaining candidate AOA as a true AOA.

19. The medium of claim 17, wherein the processor-readable instructions to cause the one or more processors to determine the plurality of candidate unwrapped PDOAs for the signal, compare the plurality of unwrapped candidate PDOAs, and identify the true PDOA based on the comparison, further comprise processor-readable instructions to cause the one or more processors to:

measure a wrapped PDOA vector for the signal, wherein the wrapped PDOA corresponds to the plurality of orientations of the UE;

generate a plurality of candidate unwrapped PDOA vectors based on the measured wrapped PDOA vector;

generate a plurality of projections onto a subspace formed by a column space of a measurement matrix for the plurality of candidate unwrapped PDOA vectors;

determine a plurality of distances between the plurality of candidate unwrapped PDOA vectors and the corresponding plurality of projections onto the subspace; and identify the candidate unwrapped PDOA vector of the plurality of candidate unwrapped PDOA vectors corresponding to a smallest distance of the plurality of distances as a true PDOA vector.

20. The medium of claim 17, wherein the processor-readable instructions further comprise processor-readable instructions to cause the one or more processors to:

calculate a direction between the UE and the target object based on the true PDOA.

* * * * *